(12) United States Patent
Beck et al.

(10) Patent No.: US 9,135,697 B2
(45) Date of Patent: Sep. 15, 2015

(54) METHOD AND SYSTEM FOR DETERMINING A BOUNDARY SURFACE NETWORK

(71) Applicant: SIEMENS AKTIENGESELLSCHAFT, Munich (DE)

(72) Inventors: Thomas Beck, Forchheim (DE); Jan Kretschmer, Erlangen (DE); Christian Tietjen, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 222 days.

(21) Appl. No.: 13/776,923

(22) Filed: Feb. 26, 2013

(65) Prior Publication Data

US 2013/0223720 A1    Aug. 29, 2013

(30) Foreign Application Priority Data

Feb. 29, 2012 (DE) .......................... 10 2012 203 117

(51) Int. Cl.
*G06K 9/00* (2006.01)
*G06T 7/00* (2006.01)
*G06T 7/60* (2006.01)

(52) U.S. Cl.
CPC ............. *G06T 7/0012* (2013.01); *G06T 7/0083* (2013.01); *G06T 7/0089* (2013.01); *G06T 7/606* (2013.01); *G06T 2207/10072* (2013.01); *G06T 2207/20016* (2013.01); *G06T 2207/30061* (2013.01); *G06T 2207/30172* (2013.01)

(58) Field of Classification Search
None
See application file for complete search history.

(56) References Cited

U.S. PATENT DOCUMENTS

| | | | | |
|---|---|---|---|---|
| 5,222,201 | A * | 6/1993 | Lis .................................. | 345/420 |
| 6,496,188 | B1 * | 12/2002 | Deschamps et al. .......... | 345/419 |
| 2003/0053697 | A1 * | 3/2003 | Aylward et al. ................ | 382/203 |
| 2003/0056799 | A1 * | 3/2003 | Young et al. ................... | 128/922 |
| 2009/0295801 | A1 * | 12/2009 | Fritz et al. ...................... | 345/424 |
| 2009/0295803 | A1 * | 12/2009 | Young et al. ................... | 345/424 |
| 2009/0322749 | A1 * | 12/2009 | Kassab et al. .................. | 345/424 |

FOREIGN PATENT DOCUMENTS

DE          102009006414 B3       9/2010

OTHER PUBLICATIONS

Hahn et.al., Visualization and Interaction Techniques for the Exploration of Vascular Structures, MeVis—Center for Medical Diagnostic System and Visualization, pp. 395-402; 2004; DE.

(Continued)

*Primary Examiner* — Shervin Nakhjavan
(74) *Attorney, Agent, or Firm* — Harness, Dickey & Pierce, P.L.C.

(57) ABSTRACT

A method is disclosed for determining a boundary surface network of the tubular object. In an embodiment, a representation of the tubular object is initially provided on the basis of image data and local dimension information is provided for points of the representation. A subdivided division structure presentation of the tubular object with division cells is then created, which based on the local dimension information, including a different spatial extent. Finally a boundary surface network is derived on the basis of the division structure presentation. Also described are a boundary surface network determination system and a division structure determination system for performing such a method.

25 Claims, 16 Drawing Sheets

(56) References Cited

OTHER PUBLICATIONS

Bookstein Fred, Principal Warps: Thin-Plate Splines and The Decomposition of Deformations, in: IEEE Transactions on Pattern Analysis and Machine Intelligence, vol. 11, No. 6, Jun. 1989 pp. 567-585.

Jianhuang Wu et al., Scale-adaptive surface modeling of vascular structures, in: BioMedical Engineering Online, pp. 1-16; 2010.

Oeltze et.al., Visualization of Vasculature with Convolution Surfaces: Method, Validation and Evaluation, in: IEEE Transactions on Medical Imaging, vol. X, No. Y, Mar. 2005, pp. 1-9.

Schumann C. et al., Model-free Surface Visualization of Vascular Trees, in: Eurographics/IEEE-VGTC Symposium on Visualization, pp. 1-8; 2007.

Oeltze, S. et.al.: "Visualization of Vasculature with Convolution Surfaces: Method, Validation and Evaluation", IEEE Transactions on Medical Imaging, Apr. 2005, vol. 24, No. 4, pp. 540-548, doi:10.1109/TM1.2004.843196; 2005.

Kazhdan Michael et.al.: "Unconstrained Isosurface Extraction on Arbitrary Octrees"; Eurographics Association Aire-la-Ville, Switzerland, Switzerland 2007; Proceeding SGP '07; Proceedings of the fifth Eurographics symposium on Geometry processing; pp. 125-133; 2007.

Ohtake Y. et.al.: "Multi-level Partition of Unity Implicits", ACM 2005, Proceeding SIGGRAPH '05 ACM SIGGRAPH 2005, Courses, pp. 173-180; 2005.

German Office Action for German Patent Publication No. 10 2012 203 117.0, dated Dec. 14, 2012.

\* cited by examiner

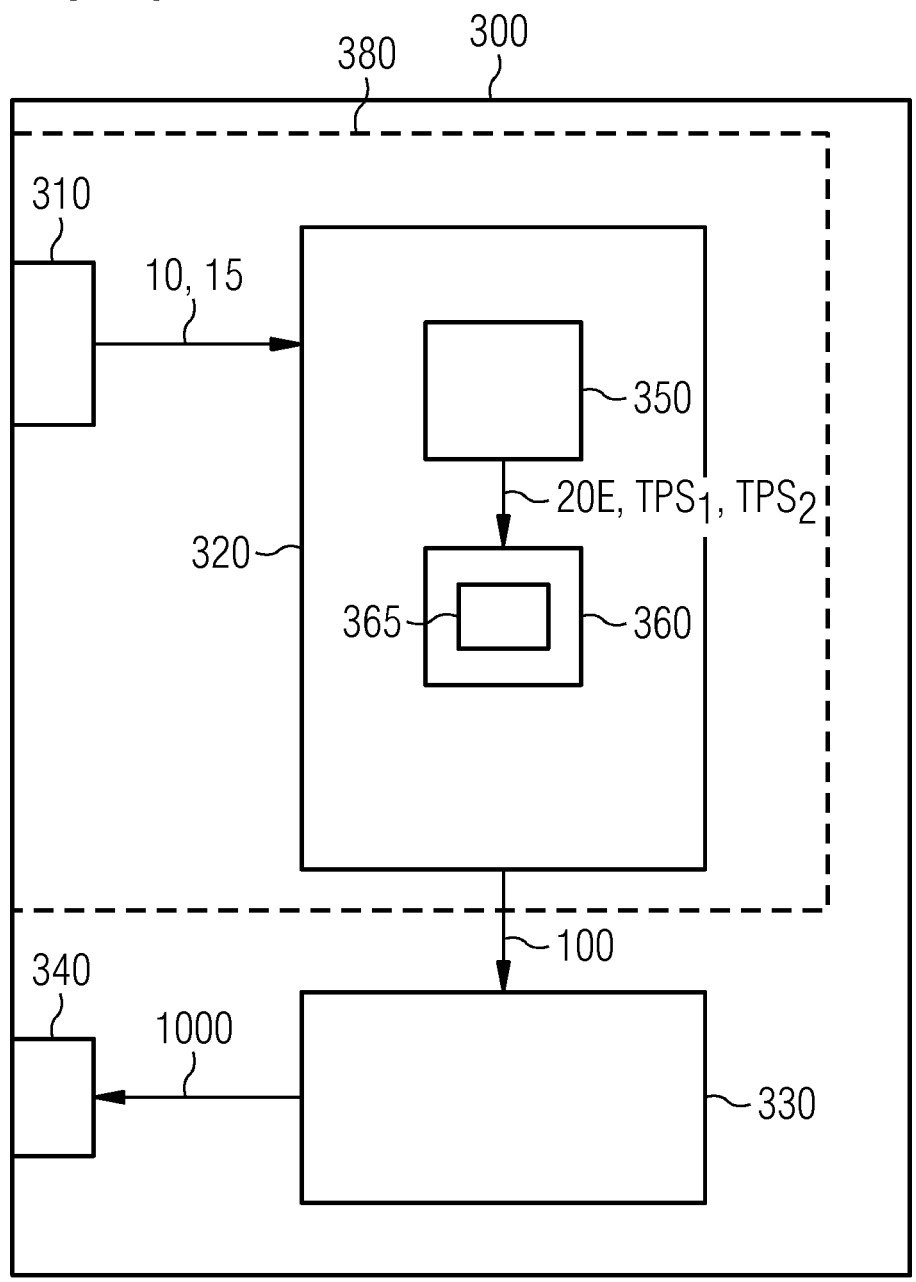

METHOD AND SYSTEM FOR DETERMINING A BOUNDARY SURFACE NETWORK

PRIORITY STATEMENT

The present application hereby claims priority under 35 U.S.C. §119 to German patent application number DE 10 2012 203 117.0 filed Feb. 29, 2012, the entire contents of which are hereby incorporated herein by reference.

FIELD

At least one embodiment of the The present invention generally relates to a method for determining a boundary surface network of a tubular object, a separation structure determination system for determining a separation structure for a tubular object and a boundary surface network determination system for determining a boundary surface network of a tubular object.

BACKGROUND

The pictorial presentation of surfaces of a tubular object with a complicated shape, such as the bronchial system, a vascular system or other hollow organs, forms the basis for a plurality of analyses, especially in the clinical field. Numerous problems can be detected for example with the aid of a fly-through of the hollow organ, the simulation of the course of a fluid or the more detailed three-dimensional presentation of critical areas, so that a further procedure can be defined especially in relation to the medical treatment. This requires that the most complete information possible about the topological structure of the tubular object is available. Such information about the topological structure can be obtained for example with the aid of imaging methods, such as computed tomography or magnetic resonance tomography for example. Without further processing the images and presentations thus obtained are only suitable to a limited extent or not suitable at all for the analyses. The multidimensional description of the surface of the hollow organ with the aid of a boundary surface network presentation or surface network modeling, abbreviated hereafter to "boundary surface network", delivers the desired geometrical information and for the above analyses should also reproduce details of the surface to a sufficient extent.

Methods are known for calculating a boundary surface network of a hollow organ in precise detail, which describe the surface with the aid of numerically complicated and computing-intensive interpolations. The calculated boundary surface networks are generally characterized by an outstanding level of accurate detail. Because the enormous computing effort involved however, these presentations cannot be calculated within a short time or instantaneously, so that real-time manipulations, for example for "what if" analyses, in order to simulate the insertion of a stent into a blood vessel for example, only enter into consideration to a limited extent on the basis of these methods for calculating a boundary surface network.

The necessary speed in the determining of the boundary surface network can be achieved by simplifying the numerical effort with the aid of a model of the surface that is as simple as possible. By contrast with "model-free" interpolation computation methods which are based on the analysis of point clouds, such models approximate the hollow organ of which an image is to be produced with the aid of a set of simple geometrical shapes such as cylinders or spheres for example. This approximation however only rarely delivers a boundary surface network of the hollow organ which reproduces critical details, especially in the area of branching points, approximately correctly. As a result of this an exact dimensioning of geometrical changes of the vascular system is unsuitable for diagnosis and treatment planning of a pathology.

For simulation of a course of the fluid it is for example necessary for the entire geometry and especially branches of the hollow organ to be reproduced as identically as possible to their natural state, and above and beyond this the boundary surface network calculated should frequently be "watertight", i.e. it may not feature any openings which are not present in reality.

Results of the model-based determination of a boundary surface network only rarely meet these requirements however, since especially the adaptation of the simple geometrical basic form is complicated when the size conditions of part structures of the hollow organ vary greatly and when branches occur. Undesired artifacts in the boundary surface network determined occur at branches as a result of simple geometrical basic model elements such as spheres or the like frequently used for modeling projecting into each other and structures which are not present in reality are modeled in the interior of the boundary surface network determined. These boundary surface networks are for example only usable to a restricted extent for the said "fly-through" applications.

SUMMARY

At least one embodiment of the invention provides an option for rapid determination of a boundary surface network of a tubular object, wherein details of the surface structure can be reproduced as precisely as possible and the generation of undesired structures inside the boundary surface network is preferably entirely avoided.

A method is disclosed for determining a boundary surface network of a tubular object, a separation structure determination system is disclosed for determining a separation structure for determining a boundary surface network of a tubular object and a boundary surface network determination system is disclosed for determining a boundary surface network of the tubular object.

Inventively a method of at least one embodiment, including the following, is proposed for determining a boundary surface network of a tubular object:

An initial step comprises the provision of a representation of the tubular object based on image data, in such cases the tubular object can especially have a number of branches. Preferably, as mentioned at the outset, this involves a hollow organ, especially a bronchial system or vascular system. The image data of the object can for example have been determined by a computed tomogram of a magnetic resonance tomograph, i.e. ultimately the data involves measurement data of these tomography systems or measurement data reconstructed therefrom. Preferably the data involves three-dimensional image data or a set of two-dimensional slice data which cover a three-dimensional volume. A representation of the tubular object is to be understood as a dataset which in some way reproduces the geometrical structure of the object, if necessary even only at specific selected positions or in sections. An example of this is the center line representation explained further on in this document. Basically the representation can however also involve the measured, unmodified or edited (for example filtered) image data itself.

A further step of at least one embodiment of the inventive method comprises the provision of local dimension information for points of the representation. This local dimension information can be provided for example on the basis of the image data or on the basis of the representation itself. In particular it is also possible for points of the representation to be assigned a number of items of local dimension information. Furthermore it is also conceivable for the local dimension information to be a direct part of the representation. The local dimension information can for example involve a diameter or a radius at a specific point (i.e. local location) of the hollow organ. The corresponding point of the hollow organ is then assigned to a specific point or object of the representation.

A subsequent step comprises the creation of a divided separation structure representation of the tubular object with division cells which have different spatial extents based on the local dimension information. The division structure representation can especially be divided up hierarchically, i.e. for example inherently dependent, and is especially preferably generated recursively. The division structure comprises a division into division cells, which do not intersect and wherein the combination of the division cells represents the entire space of the tubular object to be mapped. In the recursive embodiment of the division structure representation this applies in particular to division cells which have each been determined in a last step of the recursive method.

The space of the tubular object to be mapped corresponds to an original space which is defined in a "global coordinate system". This global coordinate system is defined in relation to a measurement space of the tomography system underlying the image generation, especially independently of the position of the tubular object in the measurement space of the tomography system. This means that the origin of the global coordinate system is for example the center of the measurement space and a first coordinate axis runs in the direction of the longitudinal axis through the measurement space, while the other two coordinate axes are orthogonal to this first axis and orthogonal to one another. To simplify further calculations, this is preferably an orthonormal right-handed system.

In a further step of at least one embodiment of the inventive method the boundary surface network is ultimately derived on the basis of this division structure representation.

With the aid of at least one embodiment of the invention it is now possible for the first time, independently of a fixed division structure size, to define a locally dependent size of the division cells, which in the final analysis determines the accuracy of the detail reproduction of the boundary surface network. In at least one embodiment of the method, the dimensions of the division cells correspond to a local sampling rate for sampling the surface of the hollow organ which, if the structure of the hollow organ requires this locally, is increased or reduced respectively.

On the one hand it is ensured in this way that at least one embodiment of the method is not too computing-intensive, so that a rapid calculation of the boundary surface network is possible. On the other hand it can be reliably prevented in this way that artifacts arise through differences in size of local structures, which for example lead to the said problems in the branching area. Thus it is especially effective to use at least one embodiment of the inventive method essentially as a model-based method, as will be described in greater detail below.

In accordance with at least one embodiment of the invention a division structure determination system for determining a division structure representation of a tubular object is also proposed. This has an input interface which is embodied to provide a representation of the tubular object. A further input interface or an input interface identical to this input interface of the division structure determination system is embodied for providing local dimension information for points of the representation. The system further comprises a division structure determination unit which is embodied to create a divided division structure representation of the tubular object with division cells. The different division cells can in this case, as previously mentioned, have different spatial extents, based on the local dimension information.

In addition a boundary surface network determination system for determining a boundary surface network of the tubular object is proposed in accordance with at least one embodiment of the invention. This system comprises the previously described inventive division structure determination system and in addition to this a network determination unit which is embodied for deriving the boundary surface network of the tubular object based on the division structure representation.

Significant parts of the division structure determination system and/or of the boundary surface network determination system can preferably be realized in the form of software on a suitable programmable processor unit, for example a diagnosis station, with the appropriate storage options. This relates in particular to the division structure determination unit and the network determination unit. The input interfaces, which can also be embodied as a single common interface, can for example involve interfaces for selection and transfer of data from a data memory disposed within the division structure determination system and/or the boundary surface network determination system or connected therewith via a network—if necessary also using a user interface. Furthermore the systems can each have output interfaces in order to transfer the data created to other units for further processing, presentation, storage etc. A largely software-based realization, especially of the division structure determination unit and of the boundary surface network determination unit, has the advantage that image data processing units or the like already used previously can be upgraded in a simple manner by a software update, in order to work in the inventive manner.

In this regard, at least one embodiment of the invention is directed to a computer program product which for example is stored in a transportable memory and/or is provided for transmission via a network and so is able to be loaded directly into one or more memories of the division structure determination system. The computer program product comprises program code sections to execute all steps of at least one embodiment of the method for determining a division structure representation and/or for determining a boundary surface network of the tubular object in accordance with at least one embodiment of the invention when the program is executed in the division structure determination system.

Further especially advantageous embodiments and developments of the invention emerge from the dependent claims as well as from the subsequent description, wherein the independent claims of one claim category can also be embodied similarly to the dependent claims of another claim category.

As already noted at the outset, model-based methods for determining a boundary surface network offer a particular speed advantage. In a development of at least one embodiment of the invention one or more local segment objects are therefore adapted to the representation, in order to achieve a largely model-based description of the surface of the hollow organ. Preferably the topological structure of the segment objects is selected from a group of basic bodies (or model basic bodies respectively).

These basic bodies will also be referred to below as (graphical) primitives or groups of primitives. They can for example include a sphere, a truncated cone, a semicircle or similar or in the simplest case only consist of a simple geometrical body. What the primitives have in common is that their surface shape can be described mathematically in a simple manner and thus a possibility for rapidly calculating points of the surface of the hollow organ is achieved. A mathematically simple-to-calculate surface shape is produced for example if a finite number of computing steps suffices for exact description of the surface and for example a closed function can be specified to describe the surface.

As will especially be explained below, at least one embodiment of the invention also provides opportunities for adapting different segment objects to one another. This means the primitives selected for adaptation can have a different topological structure from one another. For example a truncated cone can be selected in combination with a semicircle for adaptation to the representation.

As well is the advantage of rapid determination of the surface structure, the segment object division also offers the possibility of improving the division structure representation. For example with the aid of the segment objects the local dimension information required in accordance with the invention can be derived or obtained, which then for example corresponds to a minimum radius of the segment object. With a truncated cone this could for example be the radius of the covering surface, with a sphere it could be the radius of this sphere.

The local dimension information can in its turn directly represent a criterion for deriving the locally differing extent of the division cells or on the basis of the local dimension information thus formed, a criterion for locally differing extent of the division cells can be formed, which ultimately determines the quality of the adaptation of the division cells to the surface form of the tubular object.

A development of at least one embodiment of the inventive division structure determination system or of the boundary surface network determination system accordingly further comprises a segment object determination unit which is embodied to adapt one or more segment objects to the representation.

As mentioned, at least one embodiment of the invention is based on the idea of adapting the spatial extent of a division cell to local dimension information about the tubular object. Preferably a spatial extent of a division cell can be determined at a location, especially of the origin space so that the division cell would be able to be fitted completely, i.e. in its entirety, into a local reference object, i.e. a sphere, an ellipse or the like, for example.

The local reference object, which is preferably not calculated for boundary network determination can be defined in such cases based on the local dimension information, especially so that the reference object in its turn is able to be fitted into the tubular object or also into the local segment object at the relevant location.

In other words the reference object describes a locally-relevant reference range of the local dimension information provided, i.e. the reference object makes possible a simple check as to whether the size of the division cell is defined so that bounding edges of the division cell can have an intersection point with the surface section of the hollow organ. This means in particular that the method for determining the spatial extent of the division cells is such that the given conditions for possible adaptation of a reference object are fulfilled. In order to carry out the said checking it can be sufficient to determine a few reference variables of the reference object and compare them with the dimensions of the division cell. In the case of a spherically-shaped reference object, its radius can for example be compared as a characteristic variable with the dimensions of the division cell.

As an alternative a combination of one or more characteristic variables of the reference object can be included for the comparison.

In an example embodiment, the representation comprises a center line representation of the tubular object having a number of center points disposed on a center line spaced apart from one another. Preferably for center points of the center line representation a contour of the tubular object in a surface perpendicular to the center line is also specified as part of the center line representation. This can involve an approximated contour, for example in the form of a circle, or an ellipse, but also a free-form contour. Thus, at each center point, local dimension information is also given with the center point representation. The local dimension information can for example correspond to a radius of the tubular object in the area of the center point which is predetermined by the contour. With an irregular contour for example the largest or smallest "radius" (or radial distance from the center point to the contour) could be used as local dimension information. The center line representation reflects the topology and local dimensions of the tubular object in an advantageous manner, so that a representation is available which can be presented and processed with little computing effort. A representation in the form of a center line representation thus preferably forms the basis for further steps for determining a boundary surface network.

Then for example one or more segment objects in each case could be disposed between two center points arranged on the center line respectively or adapted to the center line presentation. The segment objects can for example likewise be selected on the basis of the local dimension information or make different local dimension information available. As will also become clear, the determination of the division structure representation is ultimately undertaken on the basis of the center line and especially on the basis of the segment object. The segment objects or their topological structure are preferably selected from the graphic primitives described above.

Especially preferably the division structure representation comprises an octree, and the division cell is formed by a cuboid spatial area. This cuboid can especially involve a cube. The division into the cuboid-shaped division cells offers the advantage that a seamless, non-overlapping division of a Euclidian space is produced.

In accordance with a development of at least one embodiment of the invention a bounding box, which can be n-dimensional, is determined for each segment object, i.e. can be embodied especially also merely as a rectangle. The bounding box contains a respective segment object preferably exclusively the assigned segment object, i.e. the bounding box is preferably selected just large enough for the segment object to fit into it.

This bounding box is used especially to predetermine an (n-dimensional) spatial area, in which the surface of the segment object is calculated. The calculation can be performed especially so that, for each point of the bounding box, it can be specified where the surface of the segment object is located in relation to this point. The restriction of the space in which the segment object is determined provides the opportunity of improving the speed of the creation of the boundary surface network. In this way in particular, regions not needed for calculation of the surface of the tubular object can be excluded, and it is clear that points that do not lie in a bounding box lie at so great a distance from the surface of the tubular object that they can remain unconsidered in the presentation of the boundary surface network. Because of the simple geometrical form of the bounding box this can be established quickly.

In a development of at least one embodiment of the invention, to create the division structure presentation, starting from a start division cell, a preferably hierarchically-divided subdivision of the start division cell is undertaken step-by-step from or into preferably hierarchically-dependent division cells.

This subdivision of a division cell is performed until such time as an abort criterion is fulfilled by the division cell, which is based on the dimension information. In such cases different abort criteria can be taken into consideration cumulatively or alternately.

With a first abort criterion a division cell is no longer divided up or divided when the division cell exhibits no coverage with a segment object and/or a bounding box.

With a second abort criterion a division cell is no longer further divided when a local division limit value is reached or undershot by the division cell.

With the aid of these abort strategies it is thus possible to exclude from a further subdivision spatial areas which are free from surface elements of the tubular object, and furthermore a local adaptation to the shape of the tubular object, especially its curve radii, by the local division threshold value.

Especially preferably the local division threshold value is based on the local dimension information and can accordingly be selected to be different in each case for a number of division cells.

Preferably the local division threshold value can be selected from the local dimension information.

As an alternative or in addition it is conceivable for the local division threshold value to be determined from a combination with the local dimension information, i.e. for the local dimension information to be a parameter in the determination of the local division threshold value. Furthermore it is likewise conceivable, as an alternative or in addition, for the local division threshold value to be an extreme value of the local dimension information or to be based on an extreme value of the local dimension information.

If the division cell for example exhibits a coverage with a bounding box which surrounds a truncated cone spherical segment object, the local division threshold value can be defined by the minimum of the radii of the two end surfaces, i.e. the radius of the coverage surface, or this radius is used for determining the local division threshold value. It is thus insured that a further subdivision of the division cells occurs until such time as the boundary surface of the division cell has an intersection point with the surface of the smallest locally present tubular object.

A variable division of the space can thus be achieved, which suppresses an unnecessary division of division cells in the division structure presentation. Thus in its turn a boundary surface network can be calculated more quickly.

Based on the idea that the local division threshold value defines a spatial sampling interval which specifies a spatial distance in which the surface of the tubular object is sampled, depending on the complexity of the tubular object, it can be advantageous to scale this sampling interval. The local division threshold value based on the dimension information for each division cell determined independently in each case can be defined for this purpose by a combination with a scaling factor defined jointly for a number of division cells.

For example with the aid of the common scaling factor the smallest achievable size of a division cell can be defined so that it always undershoots the local dimension information, so that closer sampling of the surface of the tubular object is achieved, without local differences in the dimensions of the division cells being lost in the process, i.e. the locally relevant density of the sampling of the surface of the tubular object is scaled at the same time. A scaling factor determined in this manner thus allows any given sampling accuracy. Furthermore a scaling factor thus determined guarantees the detection of all branches of the tubular object. This means, the topological structure of the tubular object is reproduced entirely correctly in each case.

In the same way it is however also possible that the smallest achievable size of the division cell always undershoots the local dimension information, so that a degree of compromise between topologically-correct imaging of the boundary surface and speed is achieved. If however the local threshold value for the division cell size is adhered to, the creation of the boundary surface network is topologically reliable in any event, i.e. all vessels are represented. In order to ensure that two vessels are not presented as one if the distance between them lies below the sampling accuracy, in addition to the smallest vessel dimension information, distance information can also be included as a local dimension information. Thus vessels which lie close to each other will also be visualized as separate structures.

In particular the combination of the scaling factor with the local division threshold value can involve a multiplication of the local division threshold value by the scaling factor.

As already mentioned at the start, model-based methods for determining a boundary surface network are frequently prone to artifacts in the region of branches. An especially preferred option for ameliorating these artifacts is the description of segment objects, i.e. simple primitives, with the aid of a signed distance function. This is preferably determined within the bounding box. Each segment object is therefore assigned a separate signed distance function. The signed distance function in this case specifies for each interrogation point, i.e. a point in the local space which preferably lies within the bounding box, the distance from the surface of the assigned segment object.

Thus in addition to model-based reproduction of the surface of the tubular object, an implicit description of the surface of the tubular object is also provided. On this basis segment objects adjoining each other can be combined into a common surface description. As will become clear later, this especially offers the option of describing a number of segment objects touching one another so that the outer surface of the combination volume of the segment objects, i.e. of the model of the tubular object, can always be determined.

The signed local distance function can preferably also be included to create the division structure presentation and/or to adapt the local division threshold value. Above and beyond this or in addition the signed local distance function can likewise be used for creating the boundary surface network, especially based on the division structure presentation.

In order to always describe an outer surface of a number of segment objects adjoining each other, especially preferably on the basis of a number of signed local distance functions, a global signed distance function can be determined. In this function the function values of the global signed distance function at a specific interrogation point represent an extreme value of the signed local distance function values which are included for forming the global signed distance function at this interrogation point. The following considerations are to be taken into account here:

The global signed distance function should provide information about which points are disposed outside a segment object, which points are on the surface of a segment object and which points within a segment object. As well as the described distance information the topology can thus be determined with this method in a simple manner with the aid of the global signed distance function.

The extreme value can therefore be formed for example from the minimum of the function values of a number of local signed distance functions. This is especially sensible when points outside a segment object are described by a positive distance value from the surface of the segment object and points within the segment object are described by a negative value of the signed local distance function.

The minimum thus determined, i.e. the extreme value, thus also provides the information as to whether an interrogation point lies within a volume which is described by the combination of the segment objects, or on the surface of the combination volume region or outside the volume of the combination of the segment objects. In particular all points are identified which are disposed within the combination volume. In this manner it is possible to emulate the surface of the tubular object with the aid of a number of different segment objects, wherein the surface of the combination volume of a number of segment objects lying furthest outwards is always taken into consideration for determining the boundary surface network.

The artifacts mentioned at the start within the created boundary surface network can be very effectively avoided in this way.

In a development of at least one embodiment of the invention the global signed distance function can be determined to take account of a plurality of bounding boxes. This means that the global signed distance function is merely determined in the combination of the bounding boxes which are assigned to the respective segment objects. The global signed distance function is thus then based for example on the local distance functions in these bounding boxes, so that rapid calculation of the global signed distance function is also made possible.

The distance values from the surface of the segment object or of the tubular object determined with the aid of the local and/or the global signed distance function can be included for determining the local division threshold value. The local division threshold value preferably determined on the basis of at least one signed local distance function and especially preferably on the basis of the global signed distance function can be determined in a development by a function value of the signed local distance function and/or of the signed distance function being defined in a center of the division cell involved. This division cell center can for example be defined by the intersection point of the surface normals which are each placed in the center of the surfaces, the boundary surfaces of the division cell, or as the center of gravity of the corners of the division cell.

For example the global distance function in the center of a cubic octree cell can be evaluated in this way and compared with the size of the cubic octree cell. The comparison with the dimensions of the octree cell makes it possible to establish in a simple manner whether the closest surface of the tubular object is located within the octree cell or not. This comparison can thus represent a third abort criterion for the subdivision of the octree cells, since a further division can then be considered when the closest surface of the tubular object lies within the Octree cell.

In an example modification of at least one embodiment of the invention a triangle surface network based on the determined division structure presentation is created or determined as the boundary surface network. The division structure presentation reproduces the size or determines a "maximum meshing width" of the boundary surface network, in order to map all locally relevant structures. With the aid of a global signed distance function assigned to the respective division cell a triangular surface network can then be derived in a simple manner. A method considered for this purpose is for example the so-called "marching cubes" method, in which it is determined at corner points of the division cell in each case, based on the global signed distance function, whether this corner point is located within, outside or on a surface of the tubular object.

BRIEF DESCRIPTION OF THE DRAWINGS

The invention will be explained below once more in greater detail with reference to the enclosed figures based on example embodiments. In these figures the same components are provided with identical reference characters in the different figures, in which:

FIG. 19 shows an example embodiment for a boundary surface network determination system.

DETAILED DESCRIPTION OF THE EXAMPLE EMBODIMENTS

Figure 1:
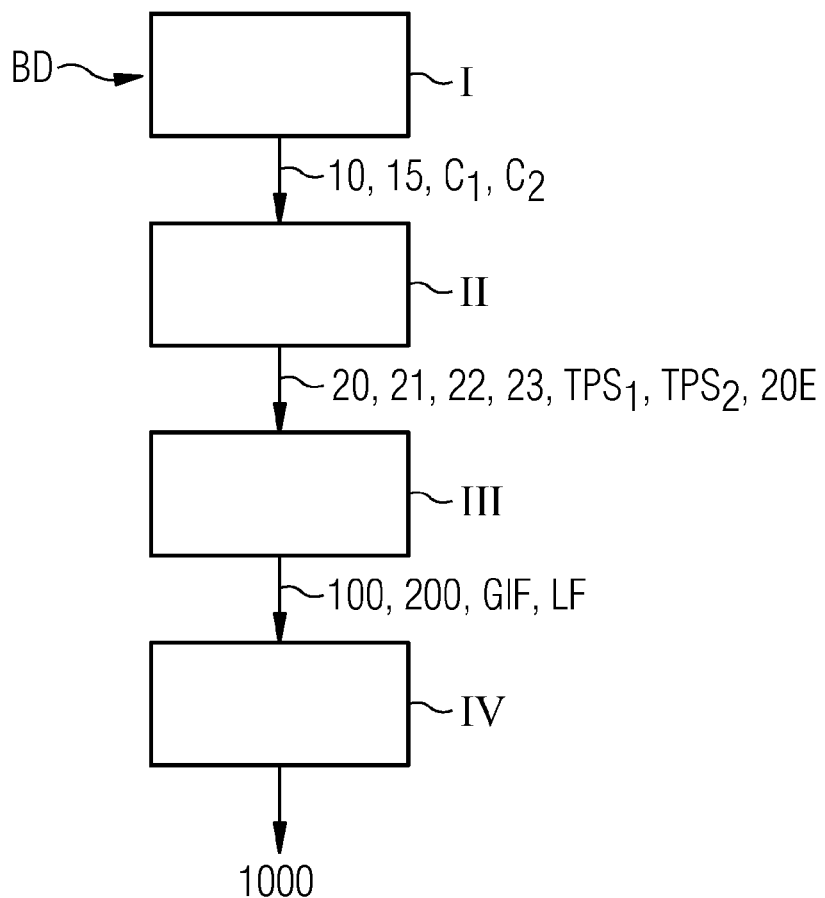
FIG. 1 shows a very simplified flow diagram for an example embodiment of the inventive method for determining a boundary surface network.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a very simplified flow diagram for an example embodiment of an inventive method for determining a boundary surface network of the tubular object.

In an initial step I of the method first of all a representation 10 of the tubular object is made available. For this purpose image data BD is analyzed, which has for example been measured with a computed tomography system or created with a magnetic resonance tomography system. Typically this image data BD features two-dimensional slices through the tubular object. The combination of a number of these two-dimensional slices in this case allows deductions to be made about the three-dimensional shape of the tubular object. The original image data can principally be used as the representation 10 of the tubular object. Since however the volumes of image data are very large, a representation 10 of the tubular object is mostly created from said data in the form of a center line presentation. Based on the image data BD in such cases a center line is placed in each tube section of the tubular object, and at regular but also at irregular intervals center points are disposed on the center line.

Figure 11:
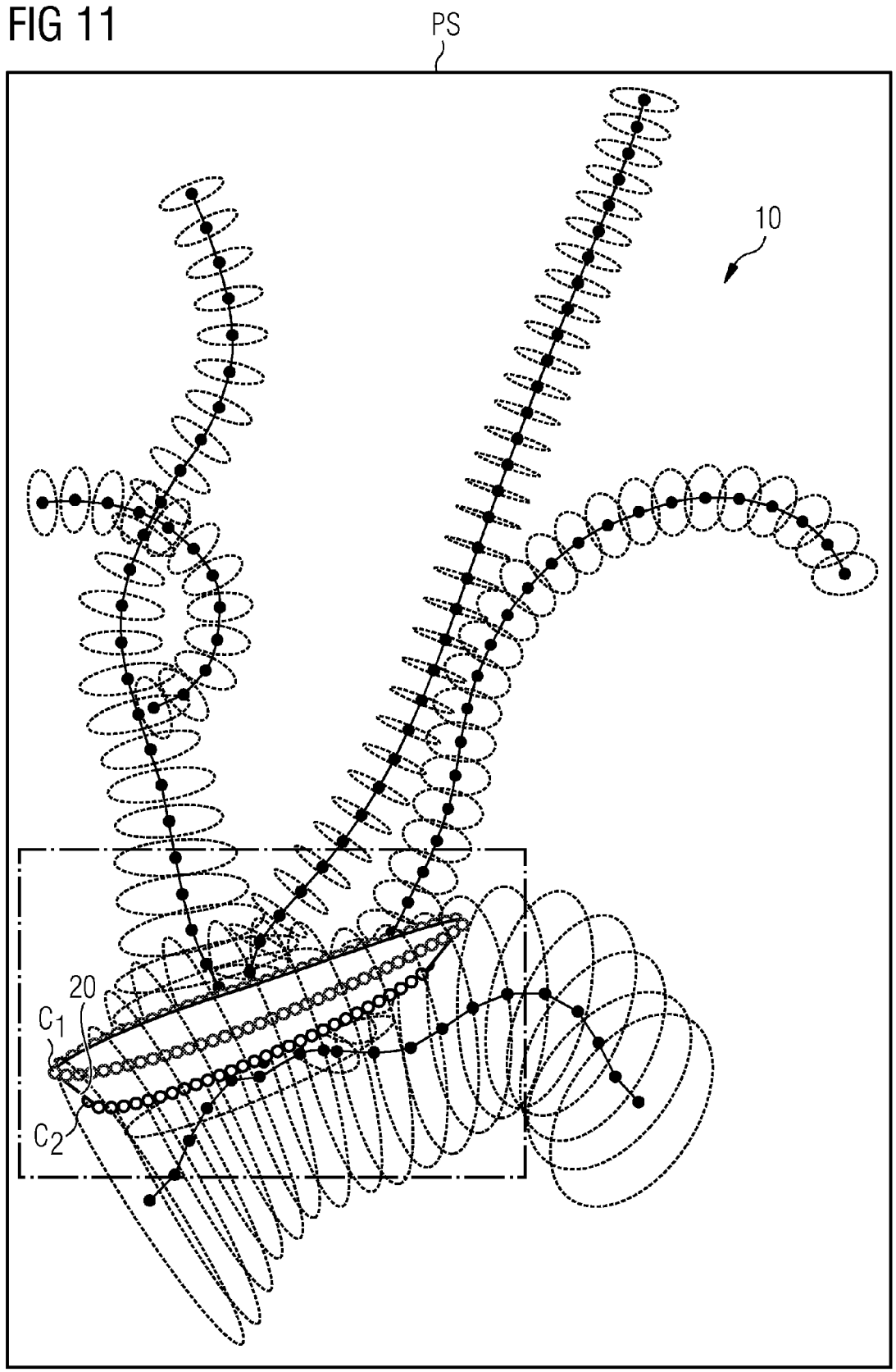
FIG. 11 shows an example embodiment for a center line presentation with an ordered row of contours for a section of a bronchial tree and two contours highlighted therein.

FIG. 11 shows a schematic of a section of a center line presentation of a bronchial tree as an example. In this case each of the center points is assigned a contour C1, C2 in a plane perpendicular to the center lines at the location of the center point (the contours C1, C2 are only shown enlarged here to mark them out from the contours at the other center points), which represents the dimensions of the tubular object in this plane. This can involve simplified geometrical contours C1, C2 approximated to the real contour of the tubular object at the respective center point, such as circles or ellipses, or as in FIG. 11, can involve free-form contours C1, C2, as will be explained later. I.e. through the center line presentation an ordered series of contours C1, C2 at the row of center points will be made available here.

Through the contour C1, C2 the center point is also assigned local dimension information 15 in each case, which for example describes the distance to the closest surface of the tubular object, i.e. the shortest distance to the surface or, with a circular contour C1, C2, simply the radius. A center point can also be assigned a number of items of local dimension information 15, so that each center point can be associated with one or more contours of the tubular object. Center points to which a number of contours C1, C2 are assigned, can for example be present in the area of branches of the tubular object.

Different methods for creation of center line presentations based on image data are known to the person skilled in the art. One method is explained for example in the German patent application DE 10 2009 006 414 B3, the entire contents of which are hereby incorporated herein by reference.

Figure 2:
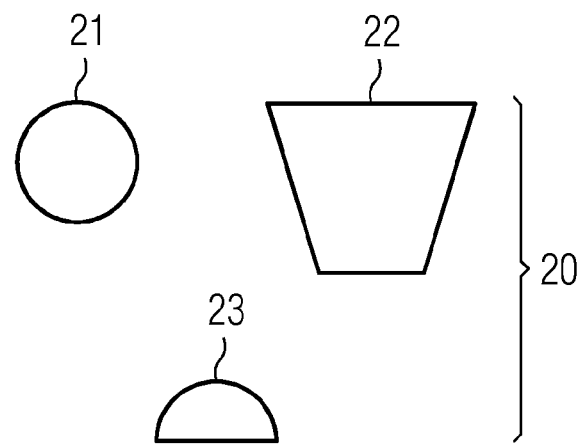
FIG. 2 shows example embodiments the geometrical primitives for use as graphic primitives.

In a subsequent step II a segment object 20 is then fitted between center points on this center line following immediately after one another. The segment objects 20 can for example involve geometrically simple-to-describe primitives (known as graphical primitives), for example a cylinder, a sphere 21, a cone, a truncated cone 22 or also a semicircle 23, some of which are shown in FIG. 2.

Especially conducive to a rapid calculation of the boundary surface network of the tubular object in this case is that an equation for such a simple segment object can be specified in a closed form or as set of easily-definable boundary surfaces, which make it possible to calculate the distance of an interrogation point from the surface of the segment object. In FIG. 11 this is highlighted on the basis of the marked contours C1, C2, which are approximated here by a truncated-cone-type segment object 20.

As will be explained again later, an embodiment of the invention also makes it possible to transfer this concept to any given free-form contours. This means that segment objects 20, which are fitted between the center points, can also be based within the framework of the invention on so-called free-form contours.

In this case the fitting of a segment object between center points can also be realized by transformation functions TPS1, TPS2 being determined for the contours C1, C2, so that these can be transformed from the origin space (shown in FIG. 11) into a unity space. Based on the transformed contours C1, C2 a unity space segment object 20E can thus be created in the unity space so that in turn the aforementioned requirement of a simple calculation of the surface shape is sufficient. In this case each unity space segment object 20E, which corresponds to a set of consecutive contours (in FIGS. 13 and 17 for example two consecutive contours C1, C2 in each case) is assigned a transformation function TPS1 or TPS2. The contours C1, C2 belonging to a unity space segment object 20E, are transformed in this case with the same transformation function TPS1 or TPS2 into the unity space. In the unity space an equation in closed form or a set of simple-to-define boundary surfaces can thus be specified with the aid of which the distance of an interrogation point in the unity space from a surface of the unity space segment object 20E can be calculated.

In a subsequent step III of the example embodiment of the invention described in FIG. 1 based on the segment object 20, 21, 22, 23 (or based on the unity space segment object 20E in conjunction with the transformation function TPS1, TPS2) a hierarchically-divided division structure presentation 100 of the tubular object will be created.

In the preferred embodiments shown here the division structure presentation 100 involves an octree 100 with cubic division cells 200. However the invention is not restricted to such embodiments.

Other division structure presentations 100 are likewise conceivable. Thus for example a quadtree or a combination of quadtrees would also be considered. The form of the division cells 200 can likewise deviate. Thus for example a pentagonal basic surface can be provided for the division cells.

The octree 100 forms a complete presentation of the origin space, i.e. in the example embodiment, especially of a space, which is described in so-called global coordinates. These global coordinates represent a coordinate system independent of the object observed and will usually be defined in relation to the measurement space of the imaging system used, i.e. the origin of the global coordinate system lies for example in the center of the imaging system and the coordinate axes can be correlated with the characteristic device axes.

In addition it is likewise conceivable that the origin space refers to a coordinate system, which is assigned to the image data BD, wherein the origin coordinates of the origin space for example lie in one of the corners of an image.

Figure 5:
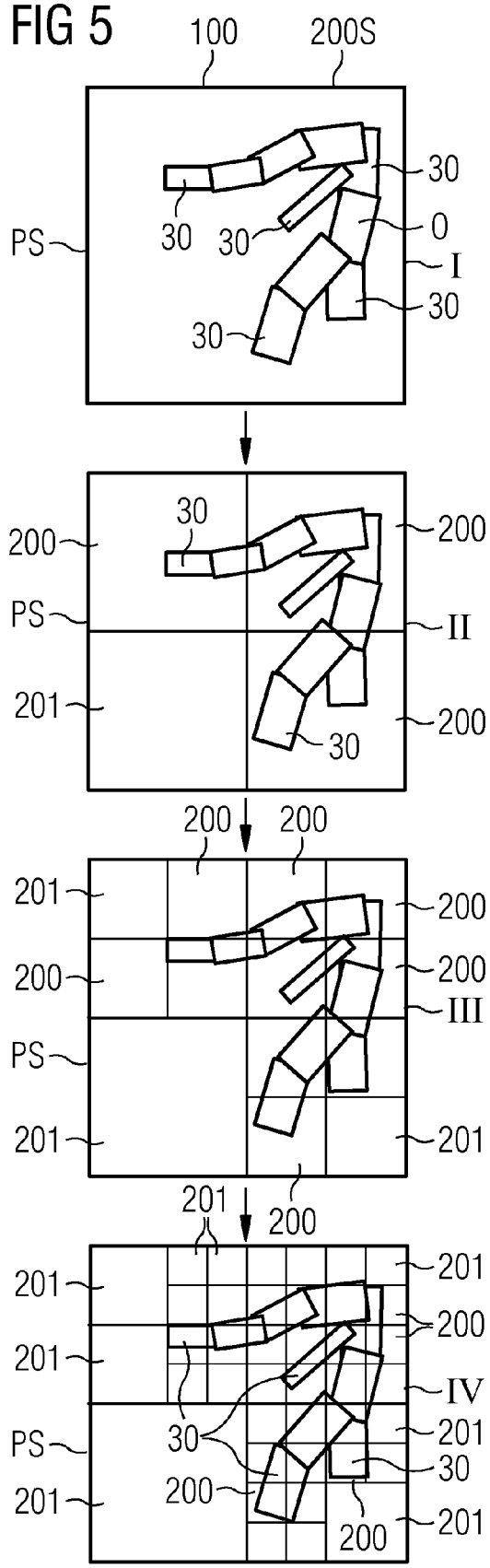
FIG. 5 shows a diagram of different possible intermediate steps for an example embodiment of a derivation of a division structure presentation.

FIG. 5, explained later, shows an example for the creation of an octree 100.

The cubic division cells 200 of the octree 100 have a different spatial extent in this case. This different extent is determined in the example embodiment, based on the local dimension information 15, as will be described later in greater detail.

In particular in this example embodiment a local signed distance function is determined for each of the segment objects 20 or the unity space segment object 20E. This local signed distance function LF describes in each case the distance for an interrogation point from a surface of the segment object or to the surface of the unity space segment object 20E.

Figure 18:
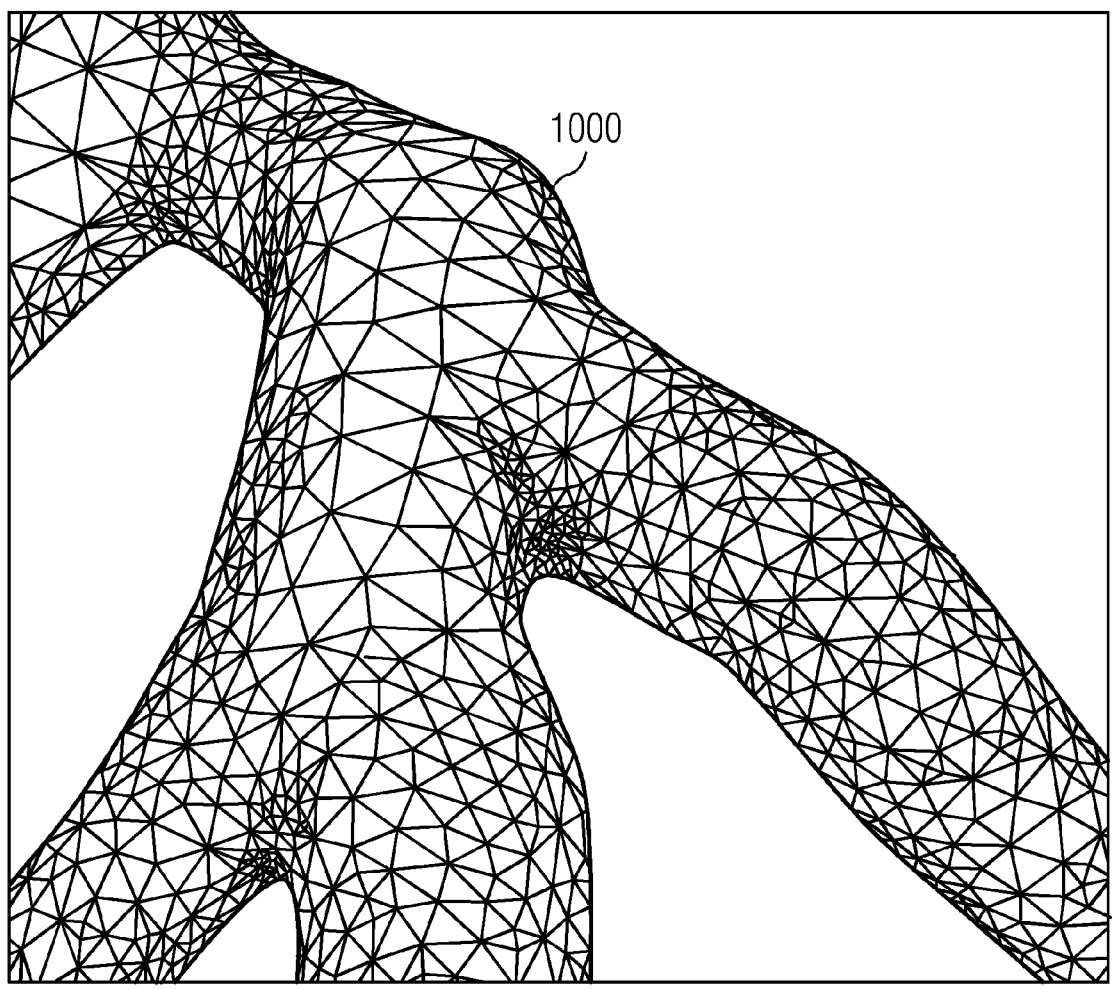
FIG. 18 shows a presentation of a possible boundary surface network for a section of a vascular tree.

In a further step IV, based on the octree and—at least indirectly—on the basis of the local signed distance function LF, the boundary surface network 1000 of the tubular object is derived from the object. Such a boundary surface network 1000 is for example shown in FIG. 18 for a section of a vascular tree.

As will be described in more detail later, intersection points of a number of segment objects 20 are approximated with the aid of a global signed distance function GF or a global indicator function GIF. The global indicator function GIF or the global signed distance function GF is based in this case respectively on the local signed distance function for the determined segment objects, independently of whether this was determined in global coordinates or in a unity space.

Figure 3:
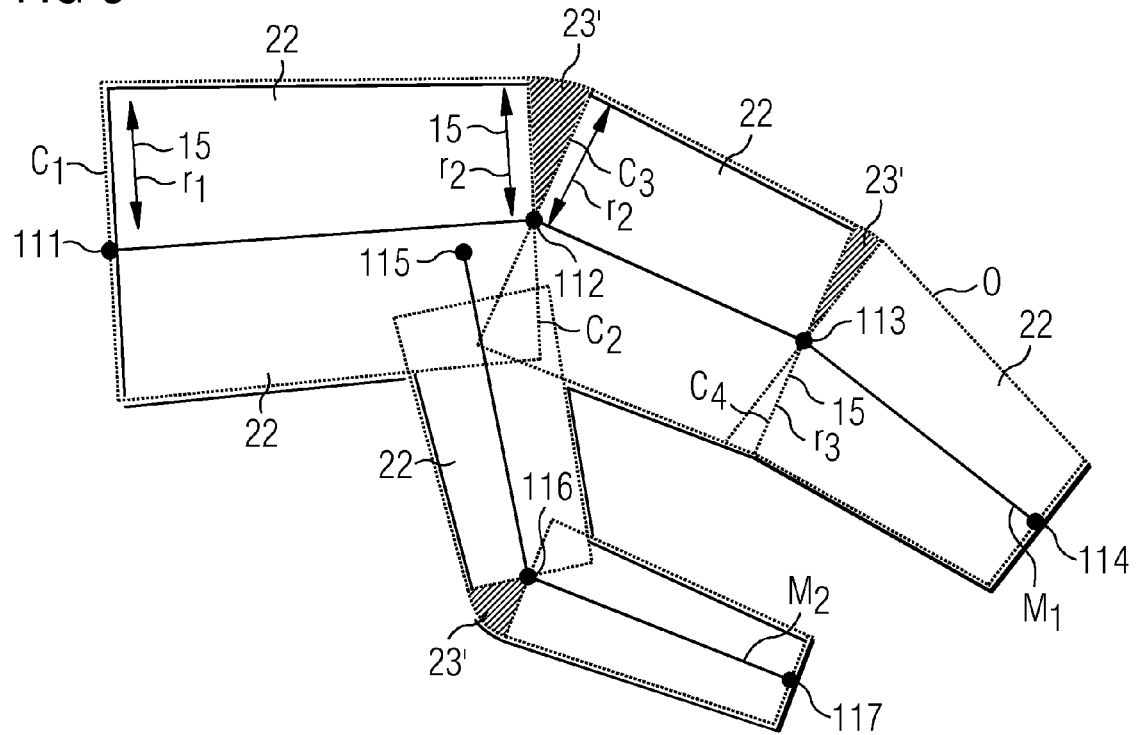
FIG. 3 shows an example embodiment of the adaptation of geometrical primitives to a center line presentation.

FIG. 3 shows an example embodiment of a representation 10 of a very simple tubular object O in detail. The representation 10 is in this case a center line representation 10. For a topological reproduction of the tubular object O in this example embodiment, on account of a branch of a number of center lines separated from one another are used, especially a first center line M1 and a further center line M2. As an alternative the branch could however also be represented by center lines coinciding, so that practically a single branching center line, similar to a tree structure, represents the tubular object O.

The center lines M1, M2 shown each extend in a straight line in sections between center points 111, 112, ... 117 disposed at irregular intervals on the respective center lines M1, M2, wherein each of the center points 111, ..., 117, as described above, is assigned at least one item of local dimension information and/or contour C1, C2, C3, C4. The local dimension information at the same time specifies the radial extent of a number of segment objects 20, which are each fitted between two consecutively-disposed central points 111, ..., 117 on one of the center lines M1, M2. These segment objects 20 reproduce in modeling terms sections of the surface shape of the tubular object O. A modeling description especially has the advantage that the complexity of the description of the surfaces of the tubular object can be restricted, so that a rapid calculation of the boundary surface network is possible with it.

The calculation is especially optimized by the segment object 20, as described in conjunction with FIG. 2, being selected from a group of graphical primitives. In FIG. 3 for advantageous approximation and model-type description of the surface shape of the tubular object O, a number of segment objects 20 topologically different from one another are fitted between two center points 111, 112, 113, 114, 116, 117 following one another on the center line representation 10.

Assigned to a first center point 111 disposed on the center line M1 here is a first radius r1 as local dimension information 15. The first radius r1 is specified in this case by the center line presentation. In the same way however it is also conceivable for the dimension information 15 to be taken directly from the image data BD on which the center line presentation 10 is based. This first radius r1 here defines a contour C1 of the basic surface of a first truncated cone 22 assigned to the first center point 111. This contour C1 lies in a plane which is perpendicular on the center line section to a neighboring further center point 112. The outer surface or assigned length of the truncated cone is specified by the distance between the first center point 111 and the further center point 112. An item of local dimension information 15 assigned to this center point 112, which comprises a second radius r2, defines the radial extent of the covering surface of the truncated cone 22 in this case. At the same time this dimension information determines a second contour C2 assigned to the further center point 112, which is assigned to the covering surface. The center line presentation makes available center lines M1, M2 with an ordered series of contours C1, C2 at their center points 111, 112, 113, 114 as well as dimension information assigned to these lines.

A segment 23' of a hemisphere adjoins the cover surface of the said truncated cone 22 with a half diameter which likewise corresponds to the second radius r2. This hemisphere segment 23' closes a gap which would otherwise remain for a further truncated cone disposed after the hemisphere segment 23'. This subsequent truncated cone 22 is disposed between the further center point 112 and a subsequent center point 113 of the center line M1 as follows. The second and third radii r2, r3 assigned to these center points 112, 113 as well as the distance between center points 112, 113 specify base surface, outer surface and cover surface of the subsequent truncated cone 22 in the manner described in relation to the first truncated cone 22. In addition the further contours C3 and C4 are defined by the basic and cover surfaces of this truncated cone.

As the example embodiment of FIG. 3 shows, with the aid of two topologically-different segment objects 20, such as truncated cone 22 and hemisphere segment 23', the number of segment objects necessary for modeling the tubular object O with a prespecified accuracy of the imaging of the surface shape is drastically reduced, so that in turn the calculation speed of the boundary surface network can be optimized.

A further center line M2 starts In the area of the branch of the object O in the vicinity of the main center line M1, so that the center point 115, which forms the start point of the further center line M2, lies within the first truncated cone 22 adapted to the first center line M1. The branching, further center line M2 thus touches or intersects a segment object 20 assigned to the first center line M1. The further center lines M2 have local dimension information 15 assigned in a similar manner in their turn to each of their center points 115, 116, 117, especially radii, so that based on the center line M2 and the dimension information 15, the surface of the tubular object O is approximated in its turn by truncated cones 22 and semi-circle segments 23'.

As can further be seen from FIG. 3, the surface of the tubular object O, especially in the area of the intersection, cannot be modeled in a simple manner by the unification of the surface of the segment objects 20. For example a truncated cone assigned to the second center line M2 would project into a number of segment objects 20 of the first center line M1.

To avoid this and yet still obtain or even strengthen the advantage of rapid calculation of a model-type description of the surface, the segment objects 20 determined on the basis of the local dimension information 15 are used within the framework of embodiments of the invention for creating an octree.

The octree, as already explained above represents a recursively created, hierarchical image of the origin space PS to which the representation 10 of the tubular object O is related.

In the creation of an octree the origin space in which the observed object O is located is divided up recursively into division cells, i.e. bounding boxes or bounding cubes so that their unification reflects the entire observed origin space. As previously mentioned, in this case the recursive division can be undertaken on the basis of the segment objects 20 adapted to the center line presentation 10 and thus especially on the basis of the local dimension information 15. The cubic bounding boxes determined then have in accordance with the invention a different spatial extent depending on the local dimension information 15. The local dimension information 15 can in addition to its assignment to segment objects in this case however be used in numerous manners to define the spatial extent of the bounding boxes.

Figure 4:
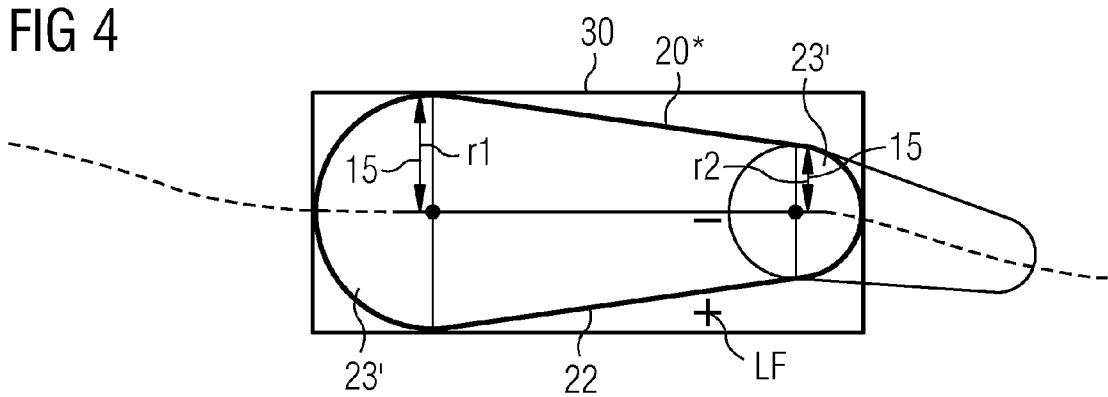
FIG. 4 shows an example embodiment for the definition of a bounding box.

Here especially each segment object 20 can be assigned a bounding box 30, which completely encloses the respective segment object 20. It is especially advantageous for the bounding box to enclose the respective segment object 20 spatially as tightly as possible, as is shown by way of example in FIG. 4 for a compound segment object 20* with a truncated cone 22 and with two hemispheres connected to it. The bounding box 30 corresponds to the minimum box which can enclose the segment object 20*. The truncated cone 22 in this case—as previously described in accordance with FIG. 3—based on the first radius r1 and the second radius r2 and based on the center line M1 with the center points 111, 112 adapted to the center line presentation 10. The spatial dimensions of the bounding box 30 described and upper limit of the extension of the segment object 20*, so that the dimensions of the bounding box 30 can be included to define the spatial extent of the division boxes—as described below Further information which can be advantageous for defining the spatial extent of the division boxes is the local signed distance function LF already mentioned in conjunction with FIG. 1. This then its turn is defined within the spatial area of the bounding box 30 for a segment object 20 written into said box and describes the distance of a given interrogation point in the bounding box 30 from a closest surface of the respective segment object in relation to the interrogation point. As indicated in FIG. 4, in the example embodiment the local signed distance function LF is defined so that, for interrogation points which lie outside the volume of the segment object 20*, it delivers positive distance values while interrogation points which lie within the volume of the segment object 20*, are assigned negative distance values. Accordingly interrogation points which lie on the surface of the truncated cone 22 have a function value of zero of the local signed distance function LF. Thus the local signed distance function LF, as well is a monotonously progressing distance function via the sign of the resulting function value for an interrogation point, also provides relative position information of this interrogation point in relation to the surface of the segment object 20* and thus also in relation to the location of the interrogation point in relation to the surface of the tubular object. For time-optimized calculation of the local signed distance function no function value is assigned to interrogation points which lie outside the bounding box 30 of the segment object 20\*, since these points are irrelevant in the further method for deriving the boundary surface network of the tubular object.

Because of the advantageous "simple" geometric surface form of the segment objects 20, which—as already mentioned—can be described with the aid of a closed function of a set of simple-to-define boundary surfaces, it is likewise possible to define the local signed distance function LF on the basis of the closed function or the set of simple boundary surfaces. The preferred analytical calculation of the local signed distance function LF thus only occupies little time so that an especially fast determination of the boundary surface network is possible.

The local signed distance function LF is thus based, as described, on the respective segment object 20\*, i.e. especially on the local dimension information 15 assigned to the segment objects or segment object 20\*. The local signed distance function LF contributes, as will be explained in greater detail later, to defining the expansion of the octree cells, so that this expansion ultimately in its turn is based on the local dimension information. In addition, in accordance with the example embodiment described, further criteria for defining the extent of the bounding boxes 200 can be included in order to achieve a determination which is as exact as possible and yet still rapid of the boundary surface network. In particular taking account of the local signed distance function in the definition of the spatial extent of the division cells 200 of an octree will be shown by way of a concrete example below. FIG. 5 shows for this purpose a division of the origin space PS into division cells 200, initially based on the dimensions of the respective bounding box 30 of the segment objects adapted to the center line presentation.

A start division cell 200S, which comprises the complete origin space PS which contains the tubular object O to be modeled, is divided up recursively into a number of division boxes 200, which are shown here for reasons of clarity only in a two-dimensional view. Also shown in the origin space PS in accordance with the center line presentation of the tubular object O are bounding boxes 30 defined as described previously, which each form a minimal box-shaped envelope of segment objects, which model the tubular object O in the origin space PS.

In a first division step TI the start division cell 200S is first divided up into eight division boxes 200 with the same dimensions, in order to obtain the "octree representation" 100 of the origin space PS. In the view depicted in FIG. 5 and the four of the division boxes 200 can be seen, which will also be referred to for the octree hereafter with "octree cells". One of the octree cells 200 this case is free from bounding boxes 30 and does not thus contain any spatial area of the tubular object O, i.e. is "object-free", while the further octree cells 200 are "object-containing".

In a subsequent, second division step TII all object-containing octree cells 200 which are covered by a bounding box 30 are in their turn each divided up into octree cells 200 with identical dimensions. The object-free octree cell 200 on the other hand is not divided up any further, so that an end measurement of this octree cell is reached. Division boxes, which have reached their end measurement in the hierarchically divided division structure presentation 100 will be referred to below as "leaves", correspondingly for the octree 100 as "octree leaves" 201.

In the example embodiment shown in FIG. 5 the described procedure is recursively repeated in two further division steps TIII, TIV. During the recursive repetition, based on the criterium of the coverage of octree cells 200 with bounding boxes 30, further spatial areas are determined that are object-free and thus in their turn form octree leaves 201.

In order to achieve the best possible approximation to the topology and the dimensions of the tubular object O, the division of the octree 100 is however also undertaken on the basis of further criteria, which define the size of the octree leaves 201. In particular for this purpose, based on the local dimension information 15, a local division threshold value Rth is determined, which defines the spatial extent of the octree leaves 201.

As already explained for example in conjunction with FIG. 4, each segment object 20 is assigned at least one item of local dimension information 15, which can be formed for example for truncated cones 22 from the first radius r1 and/or the second radius r2. So that the segment object 20 locally reaches at least the dimensions of the smaller of the two radii r1 or r2, the local division threshold value Rth is advantageously defined by the smaller of the two radii r1, r2 and thus corresponds in this case to an extreme value, the minimum of the local dimension information 15.

Figure 6:
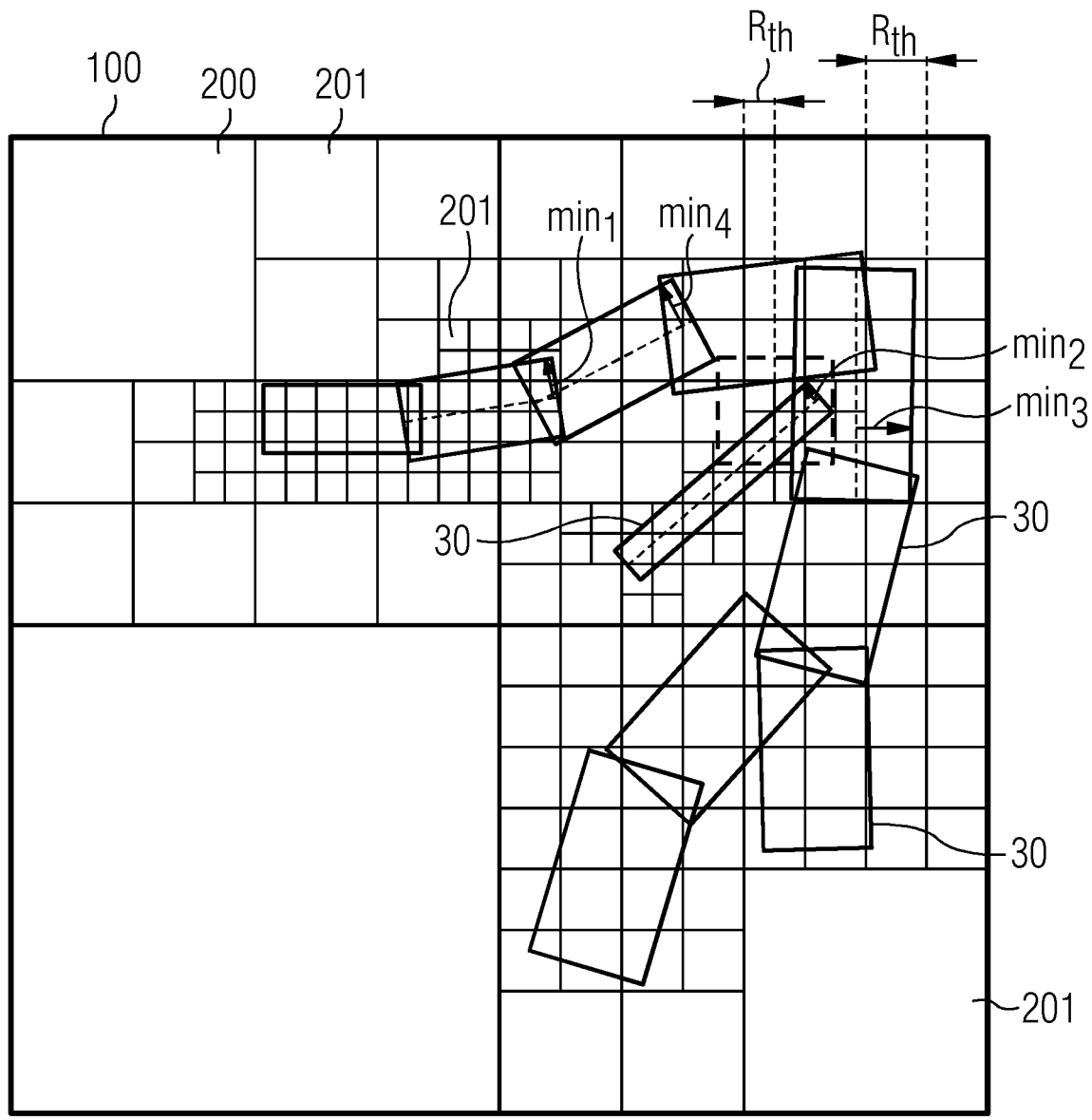
FIG. 6 shows a more detailed diagram of a step from FIG. 5.

This is for example additionally illustrated in FIG. 6 for a number of bounding boxes 30 with assigned (not shown for the purposes of clarity) segment objects. A number of minima min1, min2, . . . , min4, i.e. extreme values of the local dimension information 15 assigned to bounding boxes, are compared for this purpose. As can be seen in FIG. 6, one of the octree cells 200 has a coverage with a bounding box 30, to which a first minimum min1 is assigned. The same division cell 200 likewise additionally has a coverage with a bounding box 30 which a second minimum min4 of the local dimension information is assigned (which is marked for the sake of clarity some distance away from the octree cell 200 concerned, but correctly for the bounding box 30 concerned). The first dimension min1 is smaller in this case and the second dimension min4. This octree cell 200 is now subdivided recursively into a number of smaller octree cells 200 with identical dimensions until such time as a local division threshold value Rth, based on the minimum of the two minima min1, min4, is undershot. The local division threshold value Rth, can thus likewise be defined based on an extreme value of the number of local items of dimension information in 15 of a number of segment objects 20 and/or of a number of bounding boxes 30. In this case only bounding boxes 30 or segment objects 20 are taken into consideration which have coverage with the octree cell 200. The local division threshold value Rth is determined on the basis of all locally-relevant segment objects 20. The corresponding minimum is thus what is referred to as a "locally-relevant minimum" or a "locally-relevant extreme value". The local division threshold value Rth is accordingly an estimation of the locally-relevant smaller structure of the tubular object O in the area of the respective division cell 200.

Figure 7:
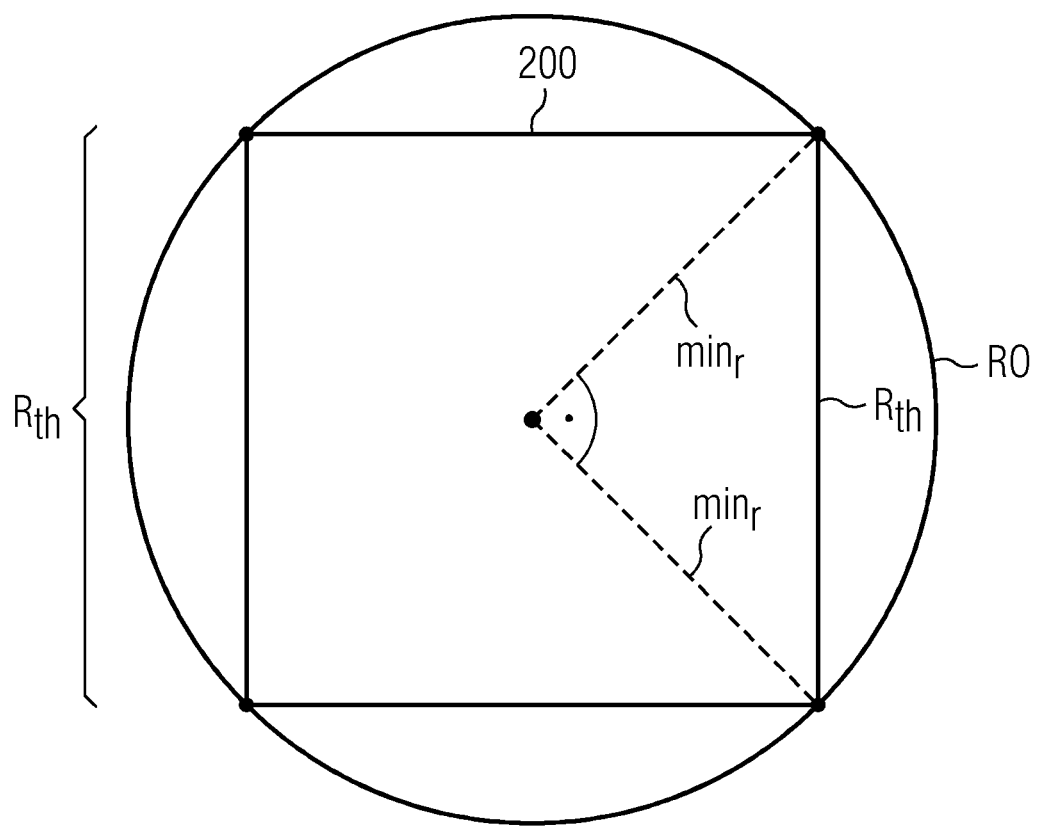
FIG. 7 shows an example embodiment for the adaptation of a reference object to a division cell.

A development of an embodiment of the invention based on this idea is illustrated with the aid of FIG. 7. The local division threshold value Rth should preferably in this case reach at most the dimension of the locally-relevant smaller structure of the tubular object, and the estimation of the local division cell threshold value Rth should be so "conservative", i.e. careful or minimal, that a segment object defined based on a local dimension information only partly covers the division cell 200 if necessary, i.e. the octree cell 200 should be smaller than the segment object. This is especially advantageous since, as will be described below, based on the coverage information of the division cells with segment objects or bounding boxes, the boundary surface network can be determined especially quickly.

In order to guarantee this conservative estimation, the local division threshold value Rth can be defined so that a smallest division cell 200 created therewith would be able to be fitted at a location (i.e. an octree leaf) completely into a local reference object RO lying at this location. The local reference object RO preferably for its part involves an object of which the surface or shape is described by a closed function or a set of easily-definable boundary surfaces, i.e. is easy to describe. In the example embodiment with cubic octree cells 200 the reference object RO involves a sphere. Depending on the basic shape of the division cell 200 however, other reference objects RO can also be selected as an alternative. For example when the division cell 200 is in the shape of a cube, rotation ellipsoids, cylinders or the like can be sensible in order to deliver an estimation that can be determined rapidly as to whether the dimensions of the division cell 200 are smaller than those of an overlapping segment object.

The spherical reference object RO is defined on the basis of the local dimension information or the locally-relevant minimum $min_r$ so that it is able to be fitted into the tubular object O or the local segment object 20 in the area of the division cell 200. The sphere thus corresponds here to a largest object that would be able to be fitted into the segment object 20 or the tubular object in the area of the division cell 200, and thus defines an upper threshold for the local division threshold value Rth. An upper threshold for the local division threshold value Rth can in this example embodiment accordingly be estimated as follows.

$$R_{th} < min_r \cdot \frac{\sqrt{3}}{2}$$

In this case it is to be stressed at this point that the locally-relevant minimum $min_r$ merely involves an example for an item of local dimension information 15. The upper threshold value can also be defined for other segment objects by other local dimension information with the aid of the described calculation.

In the example embodiment, for all object-containing octree cells 200, a further subdivision is undertaken recursively until the length of the side of the octree cells 200 in each case achieves or undershoots the local division threshold value Rth thus defined. In this way it is guaranteed that the dimensions of the octree leaves 201 are always less than the dimensions of locally-relevant structures of the tubular object O. This definition of the local division threshold values Rth therefore also guarantees that each segment object, at least at one point, intersects with the boundary surface of an octree leaf 201. This means, as will become clear subsequently, that for each segment object 20 at least one representation is created in the boundary surface network 1000. The definition of the dimensions of the octree leaves 201 in this way can thus be referred to as "topologically reliable".

Starting from this topologically reliable definition of the local division threshold value Rth, the representation of the boundary surface network can be improved even further. If for example segment objects are more closely spaced than the local division threshold value Rth, it is not guaranteed that actually separated segment objects will not still coalesce with each other in the creation of the boundary surface network.

In order to improve this situation, the local division threshold value Rth, which is determined as previously described on the basis of the local dimension information, can be defined with the aid of a common scaling factor. The scaling factor will be referred to below as the "quality factor" or abbreviated to QF and scales all local division threshold values Rth of the octree by a common factor so that the local division threshold value Rth is thus jointly scaled as shown below but however will be individually defined for each octree cell 201:

$$R_{th} < \frac{1}{QF} \cdot min_r \cdot \frac{\sqrt{3}}{2}$$

The quality factor is freely selectable as a quality parameter.

For values QF<1 the topologically reliable creation of the octree will no longer be achieved. If this is not necessary however a further speed advantage in the calculation of the boundary surface network can be achieved therewith.

For values QF<=1 a further reduction of the local division cell threshold value Rth for all octree leaves by a common factor is undertaken so that, although somewhat more time is necessary for calculation with these values, the quality of the detail presentation can be further improved.

The definition of the octree, especially with a quality factor QF>=1, as well as a topologically reliable presentation, also has the advantage that the relevant spatial area for presenting the boundary surface network is significantly restricted. This restriction can also occur without the previously described local signed distance function LF or another implicit description of the surface of the tubular object already having to have been evaluated.

If the number of segment objects have an intersection area with a common octree leaf, this could lead to a large number of superfluous divisions of the octree into octree cells which lie completely within a volume enclosed by the tubular object. In order to avoid this, a further improvement with a criterion for defining the dimensions of the octree leaves can be achieved, which ensures that the octree leaves always have at least one overlapping area with the surface of the tubular object.

As already indicated, a criterion for defining the local division threshold value Rth can also be provided by the local signed distance function LF. In order to take account of intersections of segment objects in the local division threshold value Rth, a global signed distance function GF can thus be defined by the local signed distance functions, especially with a number of overlapping segment objects, which is preferably defined within the determined minimum bounding box of the overlapping segment objects as described previously.

Figure 8:
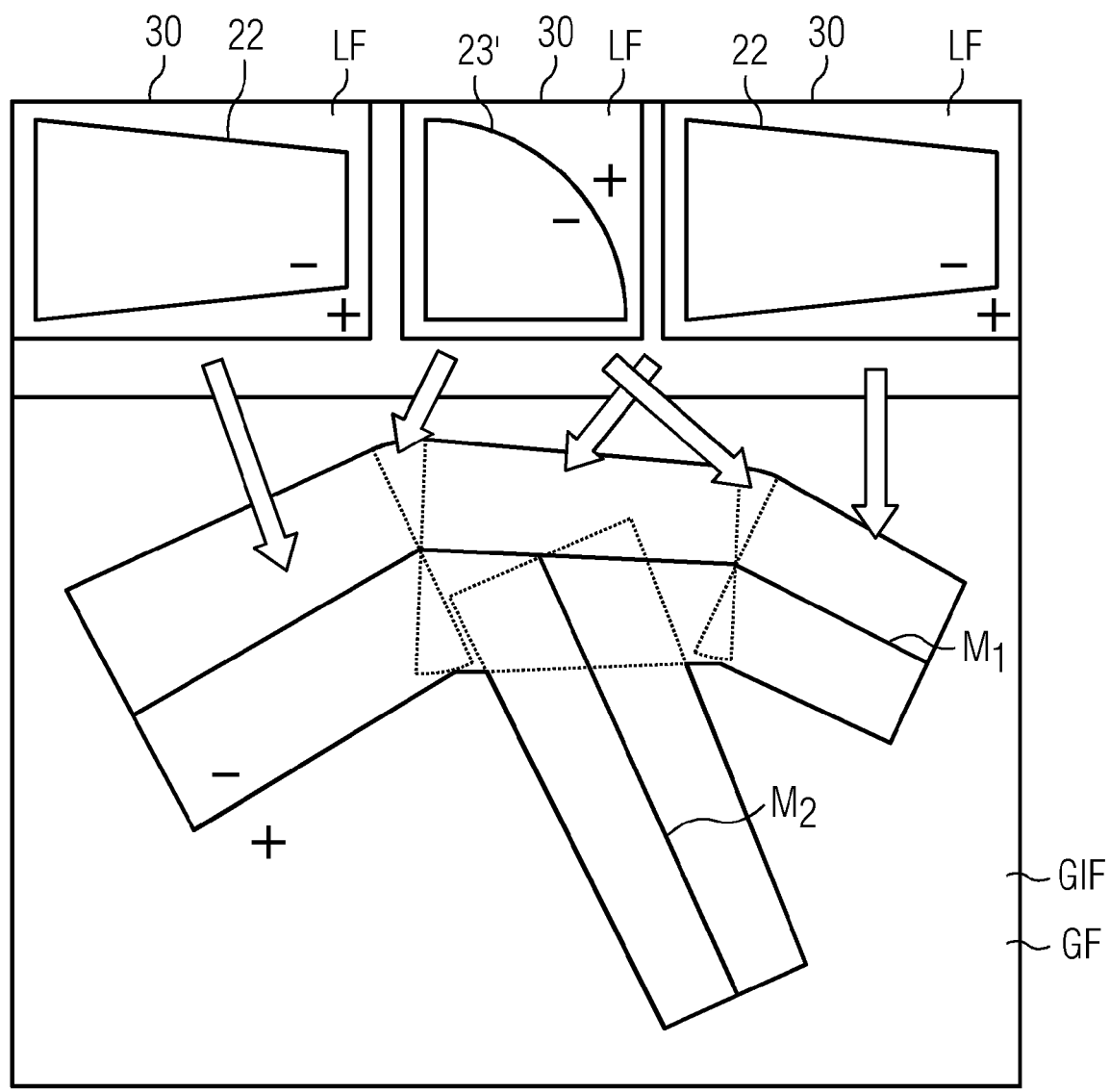
FIG. 8 shows an example embodiment for the definition of a global signed distance function.

A determination of the global signed distance function is shown in greater detail with the aid of FIG. 8.

In the example embodiment a number of segment objects formed from sphere segments 23' and truncated cones 22 once again overlap and map a section of a tubular object. Each of the segment objects, the truncated cones 22 and the sphere segments 23', is in this case assigned a local signed distance function LF in an assigned bounding box 30, which simultaneously delivers via the sign of its function value relative position information as to whether an interrogation point is located within or outside the segment objects concerned. Interrogation points which deliver a negative function value of the local signed distance function LF, lie within the segment object, interrogation points to which a positive function value is assigned lie outside the segment objects and interrogation points with function values of zero lie on the surface of the respective segment object.

A global signed distance function GF which, for each interrogation point of a division cell, is formed by the minimum value of the local signed distance function LF of the segment objects overlapping with this division cell, likewise correctly reproduces this location information. All points which lie within the unification volume of the segment objects are described with a negative function value of the global signed function GF, all points which lie outside the unification volume of the segment objects are described with a positive function value of the global signed function GF, and all points which lie on the surface of the unification volume of the overlapping segment objects 20 are assigned a function value of the global signed distance function GF of zero. The global signed distance function GF, as well as giving the distance of an interrogation point from the surface of the unification volume thus also reproduces relative location information with regard to the unification volume of a number of segment objects with the reproduction of the relative location information this thus also fulfils the function of what is referred to as a global indicator function GIF for the unification volume of the overlapping segment objects. At the same time the surface of the unification volume of the segment objects can be defined exactly.

It should be noted at this point that the global signed distance function GF thus defined does not undertake any interpolation over the surface of a number of segment objects. With the aid of the global signed distance function GF it is therefore also possible to describe sharp edges of segment objects or of the surface of the unification volume of the number of segment objects.

It should also be pointed out that the local signed distance function LF can also be defined so that interrogation points which lie outside a segment object can be reproduced with negative function values and interrogation points which lie within the segment object with positive function values. In this case, unlike in the example embodiment shown, the global signed distance function GF for an interrogation point would have to be formed from the maximum of the function values of the local signed distance functions for the respective interrogation point.

Figure 9:
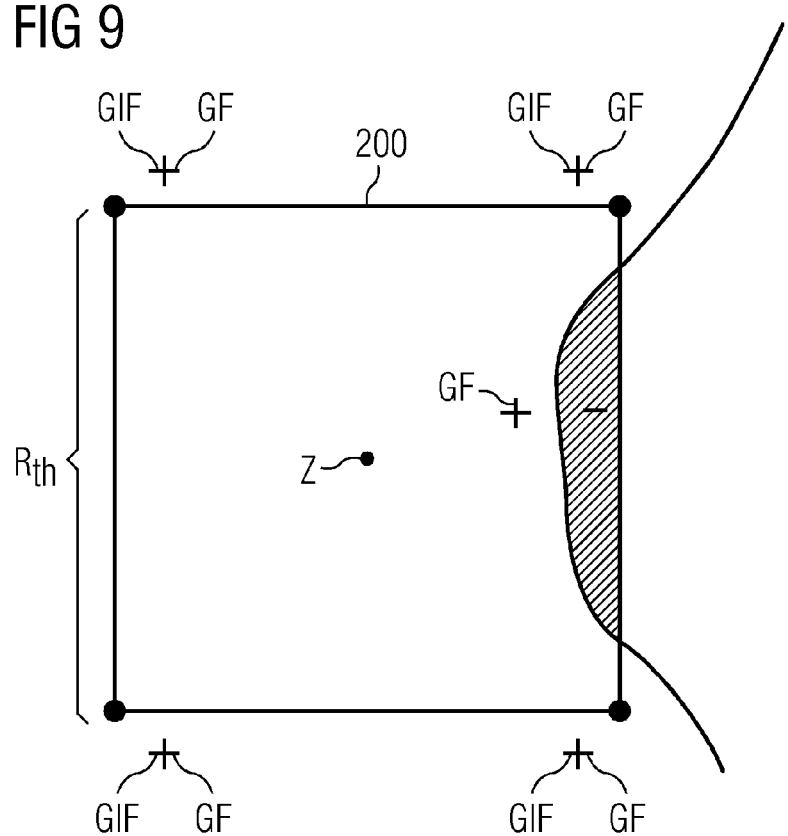
FIG. 9 shows an example embodiment for the definition of an abort criterion for division of a division cell.

FIG. 9 illustrates the use of the global signed distance function GF or of the global indicator function GIF for defining the dimensions of a division cell.

At each of the corner points of the division cell 200 the global signed distance function GF or an item of relative location information is evaluated with the aid of the global indicator function GIF. If different leading signs are present at the corner points, it is uniquely clear that the delimitation of the division cell intersects with the surface of the tubular object or the unification volume of a number of segment objects. For as long as this condition is fulfilled a further subdivision of the division sells 200 can thus take place, until finally the edge length of the division cells 200 reaches the local division threshold value Rth. If for this octree cell 200 with an edge length which corresponds to the local division threshold value Rth, there are still different leading signs at the corner points, an octree cell 200 is defined which intersects the surface of the tubular object and does not have to be further divided, i.e. represents an octree leaf. With the aid of the local signed function it can thus be established that a recursive division also continues to make sense and does so for at least until such time as the local division threshold value Rth is reached.

As an alternative to this procedure, the global signed distance function GF or an item of relative location information can also only be evaluated with the aid of the global indicator function when the dimensions of the octree cell 200 have reached or undershot the local division threshold value Rth.

A difference in the sign of the global signed distance function GF or the global indicator function GIF for one of the corner points from other corner points of the octree cell with both procedures basically represents a unique criterion that this octree cell contributes to the description of the surface of the tubular object and accordingly must be taken into account in the creation of the boundary surface network.

The case depicted in FIG. 9 shows however that in the reverse case, if (as shown here) there is no change of leading sign, it cannot be clearly excluded that the surface of the tubular object does not run through the division cell. FIG. 9 shows a concrete example of a case in which there has already been a division of the octree cell up to the division threshold value Rth, i.e. no further subdivision would now take place in were this to be the only checked abort criterion. Even if there were to be an additional check for the division being aborted that all corner points of the division cells have the same leading sign for the global indicator function GIF, a surface of the object only projecting on one side into the division cell would not be taken into consideration in the creation of the boundary surface network.

Therefore in the example embodiment, as a further improvement for determining whether a further division of the octree cell 200 up to the local division threshold value Rth is sensible, the global signed distance function GF for an interrogation point in the center Z of the division cell 200 assigned to the division cell 200 is determined in addition.

The center Z of the division cell 200 is defined in this case by the common intersection point of the central perpendiculars of the boundary surfaces of the division cell 200. The center Z corresponds in this case to a geometrical center point of the division cell 200. This definition of the center Z can be undertaken not only as here for octree cells 200, but also for other topologies of division cells 200 in a similar manner.

Based on the function value of the global signed distance function GF for the central interrogation point in center Z, a comparison is made between the distance of the central interrogation point Z from the surface of the tubular object and the dimensions of the division cell 200. If the distance of the interrogation points is below one of the dimensions of the size criterion assigned to the division cell 200 concerned, it is highly certain that it has an overlapping area with the surface of the tubular object. In this case a further division of the division cell 200 is undertaken. In a variant of the method the further division is therefore only aborted if the testing of this criterion also reveals that the surface does not project into the current octree cell.

The edge length of the cubic division cells amounts in the case shown to precisely Rth. The size criterion that is used for this comparison is given for the cubic division cells of the example embodiment by the value $$\frac{\sqrt{3}}{2} \cdot R_{th},$$

Wherein, if the checking is undertaken before the local division threshold value is reached, instead of Rth, the edge length of the division cell at the time of the checking can be used in the size criterion. A further division is undertaken in this case if the function value of the global signed distance function GF, for an interrogation point in the center Z of the division cell, undershoots this size criterion, i.e.

$$GF(Z) < \frac{\sqrt{3}}{2} \cdot R_{th}$$

In the example embodiment shown the size criterion is thus defined as the (greatest) distance from the central interrogation point to one of the corner points of the division cell and here corresponds to half of the space diagonal of the cubic octree cell 200.

It is thus possible, with the aid of the method described, to create a locally-adaptive division cell structure, whereby the dimensions or the size of the division cells are defined as locally different, based in each case on a number of criteria. In particular a division structure is created based on local dimension information, which ensures that each octree leaf, having dimensions based on a predetermined local division threshold value Rth, has at least one intersection point with the surface of the tubular segment object. In addition, with the aid of the global indicator function GIF or the global signed distance function GF, an option is provided for exact calculation of the surface of the tubular object for each of the division cells 200.

Figure 10:
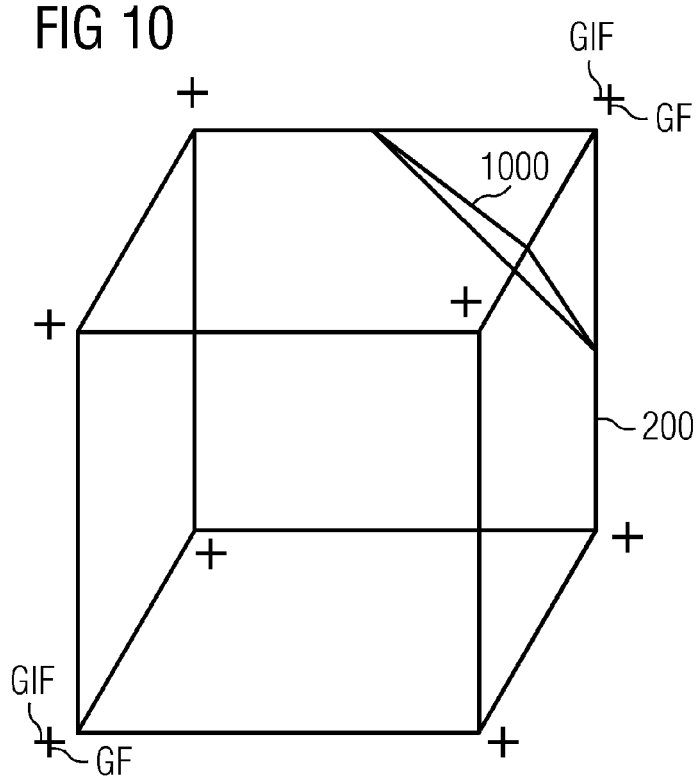
FIG. 10 shows an example embodiment for determining a mesh of a boundary surface network based on a global indicator function within the framework of a "marching cubes" method.

FIG. 10 shows the calculation of a section of the boundary surface network 1000 based on a division cell 200 of the division structure representation. With the aid of the global indicator function GIF or the global signed distance function GF, for the octree vertices, i.e. the corners of the octree cell 200, a distance or at least a leading sign is determined as to whether the octree vertex involved is located inside or outside or on the surface of the tubular object. Then, based on this information, the known "marching cubes" method can be applied to describe surface sections of the tubular object as the network and to derive a boundary surface network. With the aid of triangles, which are fitted into the division cell 200 in each case, the surface of the tubular object is emulated in the spatial area assigned to the respective division cell 200.

In the example shown in FIG. 10 the global signed distance function GF has a negative function value at one of the right-hand upper corners of the octree cell. It is thus clear for this corner point that it lies within the tubular object.

At the further corners of the octree cell the function value of the global signed function GF is positive in each case. These corner points thus lie outside the tubular object. Based on this information, a triangular surface is fitted into the octree cell 200, which accordingly takes account of the relative location information, formed by the respective leading sign of the global signed distance function GF. Since the size of the octree cell 200 is already very well adapted in relation to the locally-relevant dimensions of the tubular object an outstanding representation of the tubular segment object is already achieved by the triangle network produced.

In accordance with the method of the previously described example embodiments for creating a boundary surface network 1000, the segment objects 20 are each selected from a group of primitives in order to make a mathematical description of the surface of the segment object possible in a simple manner.

However, as already briefly mentioned, this concept can also be transferred in a preferred variant of the method to complicated-shaped sections of the tubular object, which are more advantageously described by planar non-self-intersecting freeform contours.

FIG. 11 shows a section from a center line presentation 10 of an aortic arch and branching arteries. As stated, this center line presentation 10 comprises in the origin space PS (in the global coordinator system) an ordered series of contours C1, C2 on the center points disposed on a center line through the respective branch of the arteriovascular system. Each of the contours C1, C2 is linked here with one or more items of local dimension information. In a section marked by dashed lines, two free-form contours C1, C2 are highlighted for example, which in accordance with the previously described method, could each be approximated by a truncated cone-type segment object 20.

Figure 12:
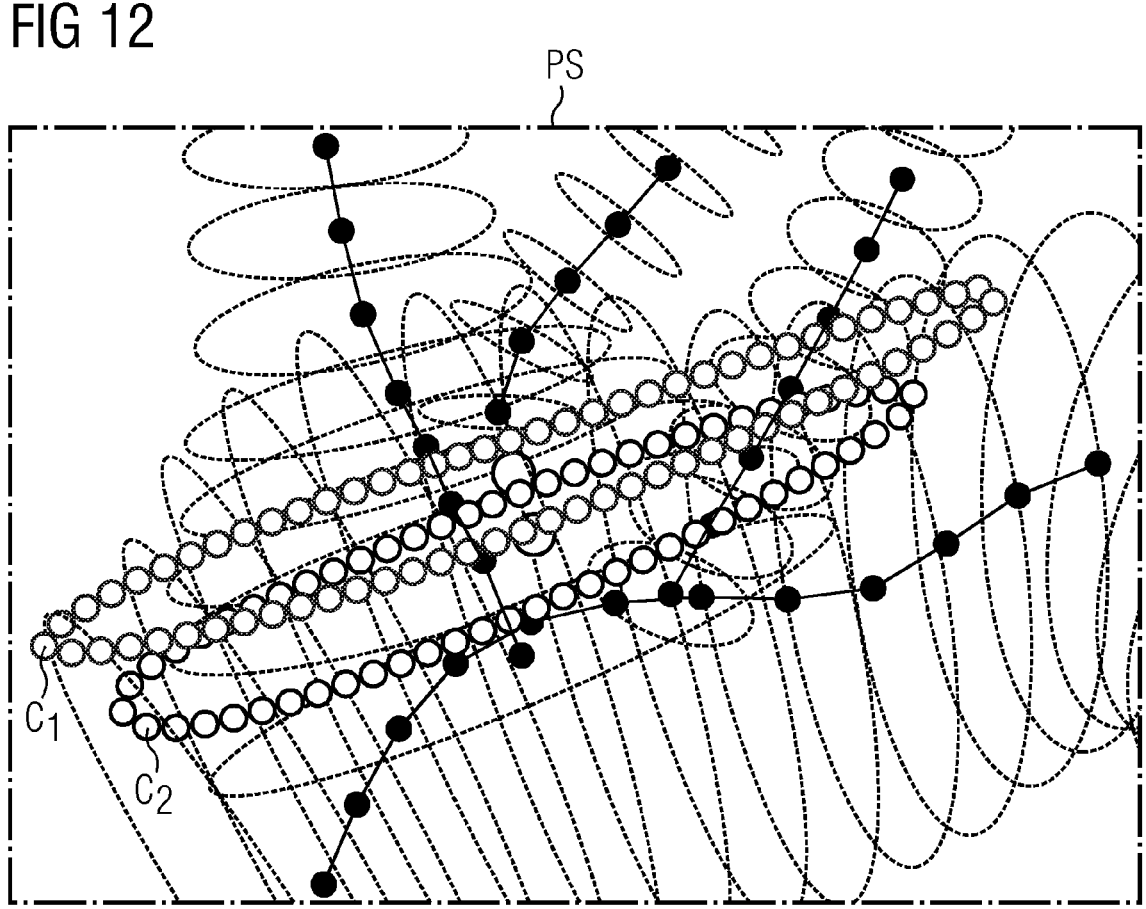
FIG. 12 shows a detailed view of a section of the center line presentation from FIG. 11 with the two highlighted contours.

In FIG. 12 this marked section is shown enlarged, so that these contours C1, C2 are shown in greater detail. It can be seen here that the approximation to the surface shape of the arterial blood vessel tree by a truncated cone-shaped segment object 20 only succeeds locally relatively roughly for the series of contours C1, C2 shown.

Figure 13:
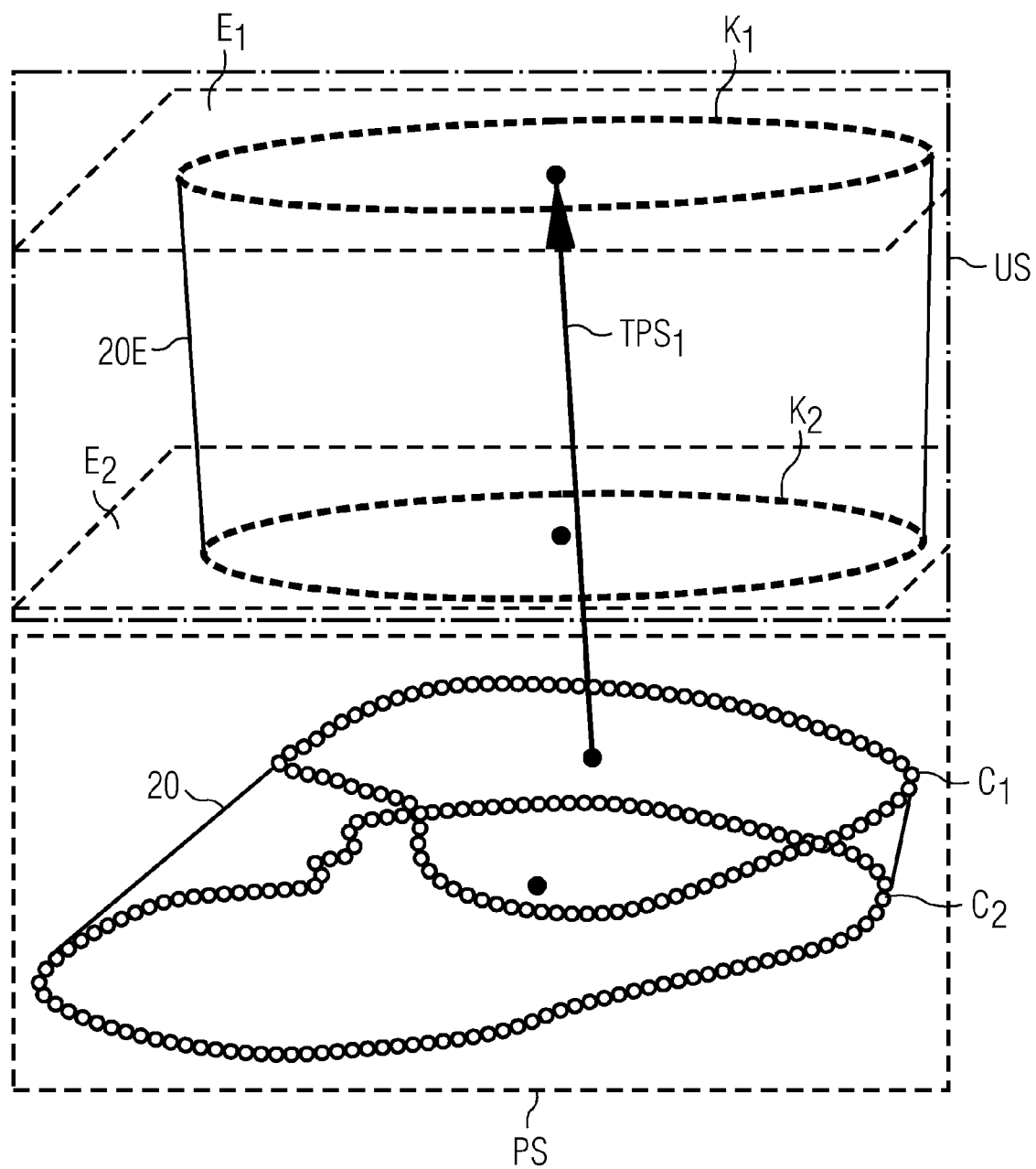
FIG. 13 shows an example embodiment for the transformation of two contours not crossing one another from an origin space into a unity space.

FIG. 13 shows an improved option for simple creation of a boundary surface network, for example with the method described above, even if the surface of the bronchial tree is described by complex free-form contours C1, C2.

For the contours C1, C2 a transformation function TPS1 from the origin space PS in the global coordinates system into a unity space US is determined, wherein the transformation function TPS1 transforms the contours C1, C2 in each case into a plane E1, E2 in the unity space US.

The transformation function TPS1 in this case respectively forms the consecutive contours C1, C2 defined in the origin space PS in the unity space to contours with a circular bounding edge K1, K2 lying in the respective plane E1, E2.

Furthermore the bounding edges K1, K2 here define an essentially cylindrical or oblique cylinder-shaped unity space segment object 20E, since the corresponding planes E1 and E2 are disposed essentially in parallel to one another in the unity space. I.e. the delimitation edges K1, K2 do not have any common point in the example embodiment shown in FIG. 13.

Distance calculations for the unity space segment object 20E for interrogation points of the unity space are therefore possible in a simple manner, since the signed distance function of the unity space segment object 20E is able to be defined on the basis of the closed function or the set of simple boundary surfaces. The advantages already described in relation to the use of primitives relating to the definition of a local signed distance function can thus be transferred to the unity space segment objects 20E. The mathematically complicated interpolation of the surface of free-form contours for calculating a segment object which would otherwise be needed in the origin space PS in the previously described method for creating a boundary surface network is thus avoided in the unity space without any significant disadvantages arising here.

In this case use is made of the fact that in accordance with the previously described method for determining a boundary surface network, a relative location information for an interrogation point of the global coordinate system (i.e. information as to whether the point lies inside, outside or on the surface of the object) can suffice to derive a division structure presentation and to determine a boundary surface network of the tubular object.

In the example embodiment the transformation functions TPS1, TPS2 are based on what is referred to as a thin plate spline transformation. These types of transformations are known in principle to the person skilled in the art. A description can be found for example in IEEE Transactions On Pattern Analysis and Machine Intelligence, Vol. 11, No. 6, June 1989: "Principal Warps: Thin-Plate Splines and the Decomposition of Deformations", the entire contents of which are hereby incorporated herein by reference. These transformations from the origin space PS into the unity space US, although they do not contain distance, the decisive factor is only that the relative location information is retained in the transformation into the unity space. I.e. interrogation points which are disposed in the origin space PS outside a segment object defined by the contours C1, C2, are also disposed after transformation in the unity space US with the aid of the transformation function TPS1 or TPS2 outside the unity space segment object 20E. A corresponding point correspondence is also provided for interrogation points on the surface or for interrogation points within the segment object defined by the contours C1, C2.

A signed local distance function LF defined in the unity space US for the surface of the unity space segment object 20E reproduces this location information for interrogation points in the unity space US.

For interrogation points of the origin space PS it is sufficient to obtain relative location information in relation to the segment object 20 defined by the contours C1, C2, i.e. from the fact that the interrogation point is also transformed with the aid of the transformation function from the origin space PS into the unity space US and a distance with regard to the unity space segment object 20E is determined with the aid of the signed local distance function. The leading sign of the local signed distance function in the unity space US reproduces this required relative location information.

This procedure thus makes it possible to assign relative location information relating to a segment object 20 in the origin space PS to an interrogation point in the origin space PS in a unique manner, without the surface of the segment object 20 being described at all in the origin space. An interpolation of segment objects 20 in the origin space PS, i.e. for example in the global coordinate system, based on free-form contours is thus not necessary for creating the relative location information.

Figure 14:
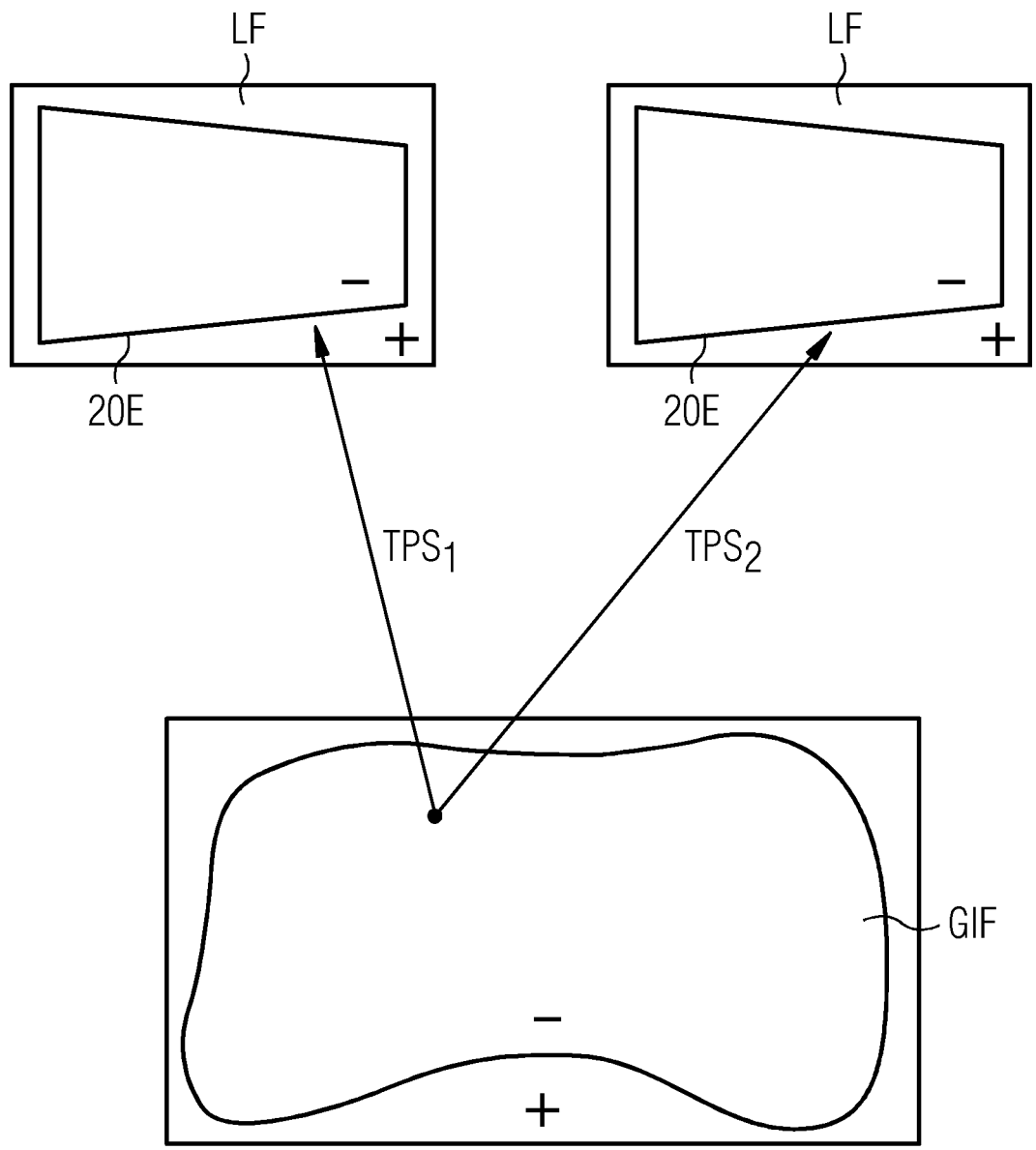
FIG. 14 shows an example embodiment the definition of a global indicator function.

FIG. 14 shows a definition of a global indicator function for interrogation points in the origin space PS, with the aid of which—as already mentioned—various advantages can be obtained in the definition of the boundary surface network. For example it can be defined whether a further division of octree cells is sensible. In addition the global indicator function can also be used for derivation of the boundary surface network with the aid of the "marching cubes" method.

Each interrogation point which is disposed in the origin space PS within a bounding box 30 can be assigned a function value of the global indicator function GIF. The bounding box encloses a number of contours in the origin space PS, on the basis of which, in a number of unity spaces US, a unity space segment object 20E is assigned in each case. In this case each of the unity space segment objects 20E in the different unity spaces US is assigned an individual transformation function TPS1, TPS2.

Distances from the surface of the unity space segment objects 20E in the respective unity space US are in this case likewise described by a local signed distance function LF. In this case interrogation points which in their turn lie in the unity space US within the volume of the unity space segment object 20E, are assigned negative function values of the local signed distance function LF.

The global indicator function GIF for an interrogation point in the bounding box 30 is now determined by transformation of the interrogation point in each of the number of unity spaces US with the aid of the individual transformation functions TPS1, TPS2 of the number of unity space segment objects 20E. For the transformed interrogation point a distance value to the surface of the respective unity space segment object 20E can be calculated in each of the unity spaces US with the aid of the local signed distance function LF. The global indicator function GIF is then assigned for the interrogation point of the minimal function value of the local signed distance function LF related to the transformed interrogation points. This includes the fact that only the leading sign of the minimal function value forms the global indicator function GIF when the minimal function value is not zero. In a similar fashion the global indicator function GIF must also be formed on the basis of the maximum of the local signed distance functions for the transformed interrogation point, if the local signed distance function LF assigns a positive distance value from the surface of the unity space segment object to interrogation points which lie within the volume of the unity space segment object 20E.

With the aid of the global indicator function GIF thus determined a boundary surface network can be quickly created, especially in the manner described in conjunction with FIG. 10. At the same time the global indicator function GIF represents a quick-to-calculate, unique, model-type description of the surface of complicated-shaped sections of the tubular object (namely simply through all points at which the global indicator function GIF is zero), without complicated-shaped segment objects having to be interpolated for this purpose.

Figure 15:
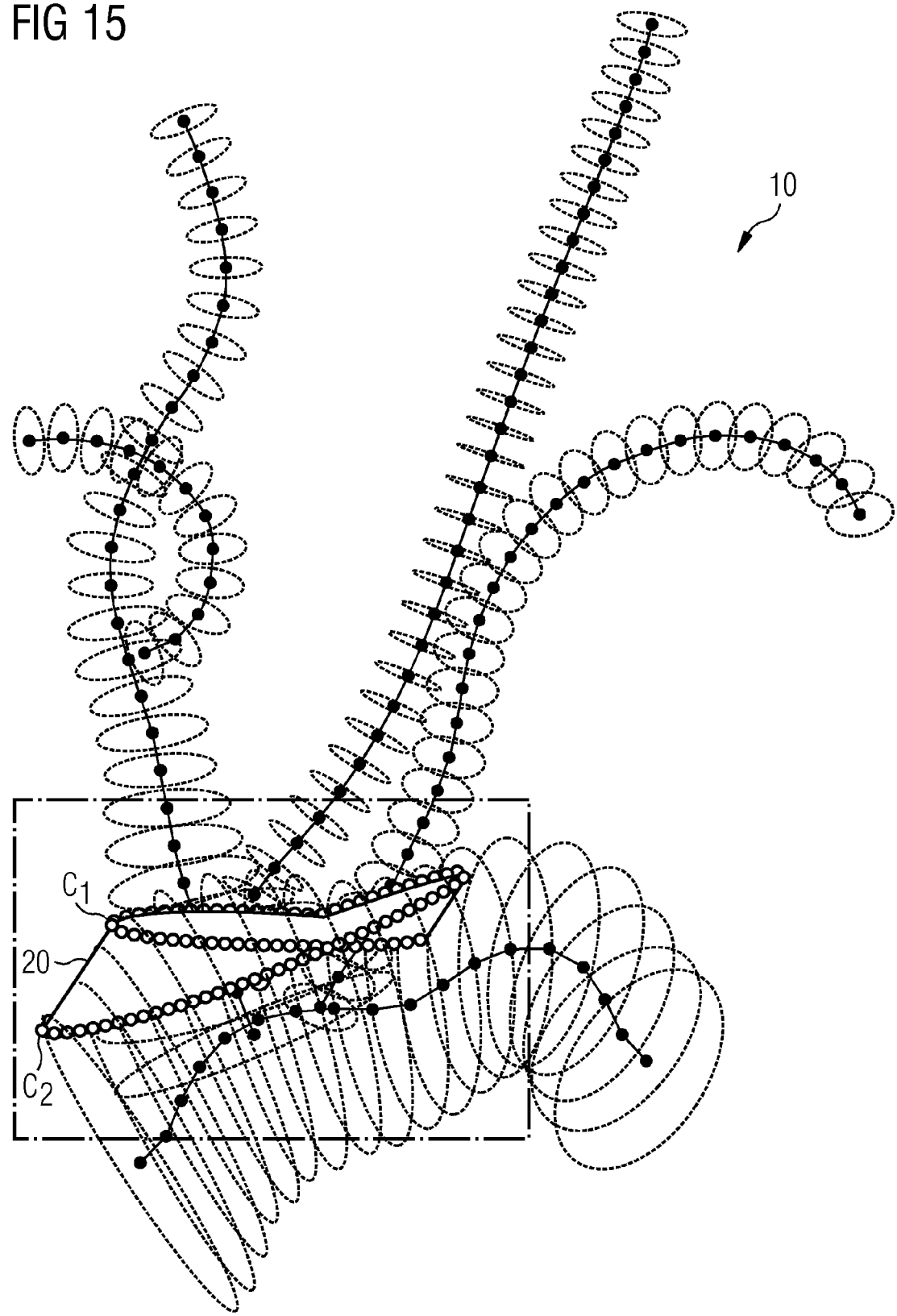
FIG. 15 shows an example embodiment for a center line presentation with an ordered row of contours for a section of a bronchial tree as depicted in FIG. 11, but with two contours crossing one another highlighted therein.
Figure 16:
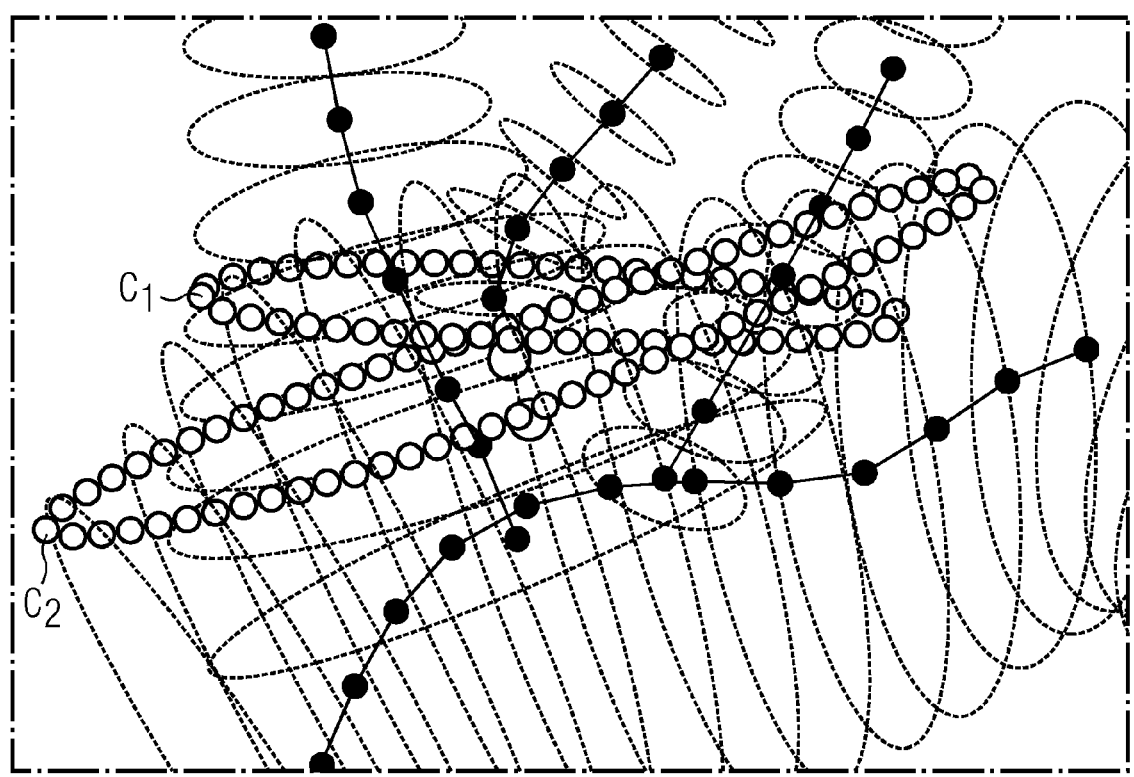
FIG. 16 shows a detailed view of a section of the center line presentation from FIG. 15 with the two highlighted contours.
Figure 17:
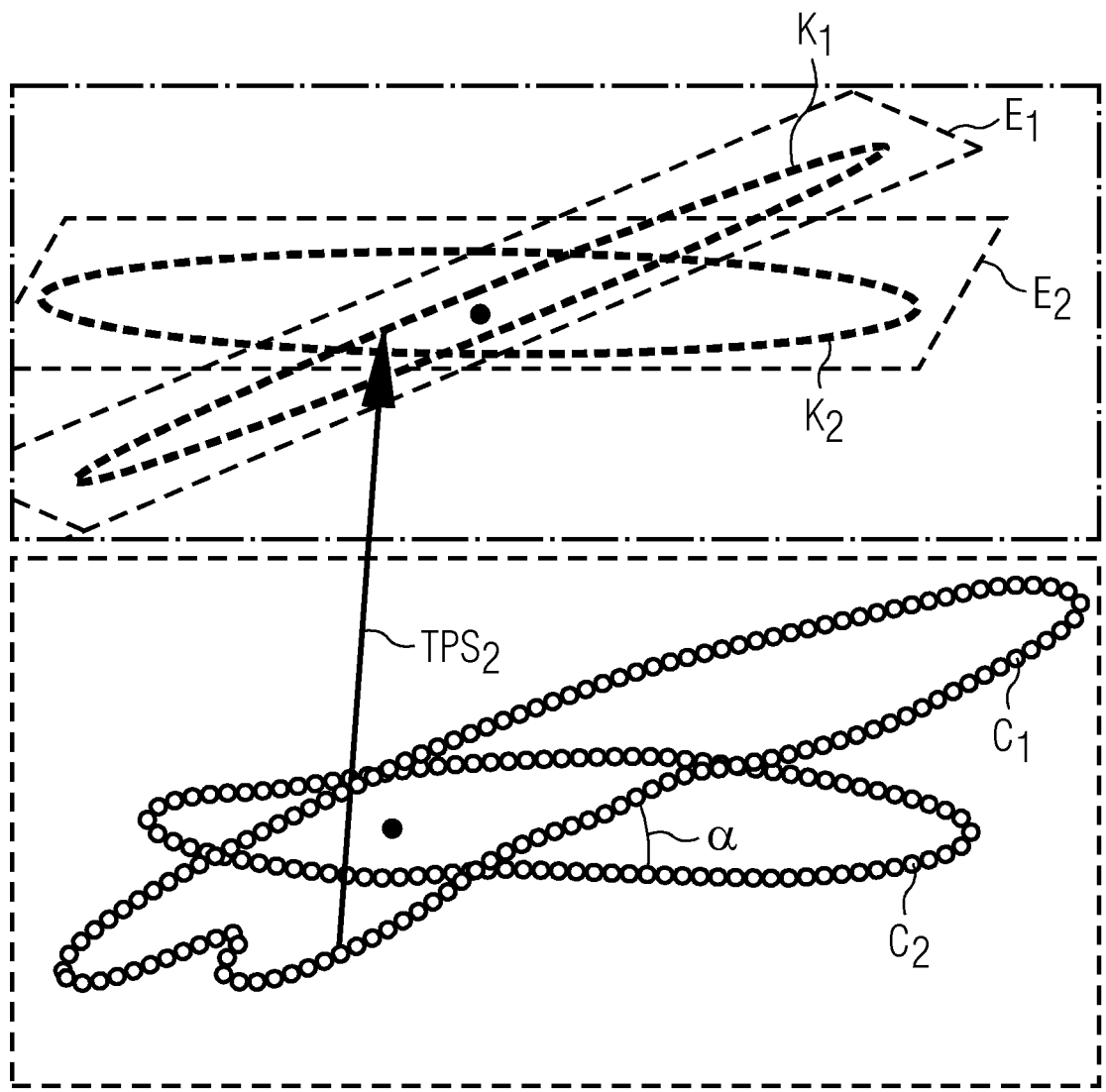
FIG. 17 shows a further example embodiment for the transformation of contours into a unity space as depicted in FIG. 13, but with the two contours crossing one another.

The fact that with this principle complicated sections, for example branches, of the tubular object are also taken into consideration, is illustrated particularly with the aid of FIGS. 15 to 17.

FIG. 15 again shows a section of an arterial vessel system in origin space PS as in FIG. 11. In this case in the center line presentation 10 two contours C1, C2, especially directly following one another, are marked in a branching area. A model-type description of this section of the arterial blood vessel system by segment objects 20 in the origin space PS would require the adaptation of a plurality of segment objects. The representation of this segment in the unity space US can on the other hand reduce the number of the segment objects needed and thus in its turn accelerate the definition of the boundary surface network.

As can especially be seen from the detailed segment depicted in FIG. 16 (an enlargement of the dotted-line area from FIG. 15) of the arterial blood vessel system, the highlighted contours C1, C2 cross over each other in the origin space PS. I.e. a very complicated segment object would have to be used here for local modeling in the origin space PS between the contours C1, C2.

FIG. 17 shows the transformation of the crossing contours C1, C2 from the origin space PS into the unity space US with the aid of an individual transformation function TPS2. Here too the contours C1, C2 are once more transformed to circular bounding edges K1, K2 in the unity space. The bounding edges in this case again lie in the unity space US in a plane E1, E2 assigned to the respective bounding edge. These planes E1, E2 intersect (as in the origin space PS) in the unity space US at an angle, are thus disposed tilted in relation to one another, and the bounding edges K1, K2 have a number of common points (namely on the intersection line of the two planes E1, E2), as is also the case for the associated contours C1, C2 in the origin space PS.

Furthermore bounding edges K1, K2 disposed tilted in relation to one another in the unity space US can only have one common point, i.e. if the bounding edges K1, K2 in the unity space US (and accordingly the contours C1, C2 in the origin space PS) merely touch. In addition it is also conceivable, for bounding edges disposed tilted in relation to one another, not to have any common point in the unity space, if for example the associated contours C1, C2 also do not intersect in the origin space PS.

But in all these cases the surface of the unity space segment object 20E that is formed by tilted planes E1, E2 in the unity space can be formed and described in a simple manner. In this case unity space segment objects 20E always result, which in some sections at least, can be described by surface sections of the outer surface of a truncated cone or of a cylinder. These outer surface sections define the shortest connections between the different bounding edges K1, K2 in the unity space US. This makes possible a simple description of the surface of the unity space segment object 20E, so that the described advantages of a fast calculation of the signed local distance function LF can be realized therewith, which as described can be used for determining a boundary surface network of the signed distance function.

Finally FIG. 19 shows a rough schematic of a boundary surface network determination system 300, with which, in the manner previously described, a determination of the boundary surface network can be undertaken. The boundary surface network determination system 300 is preferably realized here on a computer system or a combination of computer systems and comprises a division structure determination system 380, which has an input interface 310 and a division structure determination unit 320 here.

With the aid of the input interface 310 a center line presentation 10 determined on the basis of image data of the tubular object is recorded. This center line presentation 10 is available in the form of a dataset and is made available to the division structure determination system 300 in digital form via the input interface 310. The center line presentation 10 in this case, as described above, comprises contours of the tubular object lying in an origin space in an ordered series, to which local dimension information 15 of the tubular object is linked.

Furthermore the input interface 310 can also be embodied to record further settings of the delimitation network determination system 300 or of the division structure determination system 380, which a user can enter. For this purpose it can for example include a keyboard, touchscreen, mouse or similar or be linked to such a device. For example the "quality factor" mentioned can be provided to the system with the aid of the input interface 310, so that this value can be flexibly modified by a user.

The center line presentation 10 recorded with the aid of the input interface 310 and also the local dimension information 15 is transferred to the division structure determination unit 320 which, based on the center line presentation 10 and the local dimension information 15, as previously described, determines and provides an octree 100 with division cells for the tubular object.

The boundary surface network determination system 300, also has a segment object determination unit 350, here as a part of the division structure determination unit 320, which on the basis of consecutive contours of the center line presentation 10 in each case, can determine one or more unity space segment objects 20E in a unity space. The segment object determination unit 350 is embodied, as explained above, to define for each of the unity space segment objects 20E a separate transformation function TPS1, TPS2 from the origin space into the unity space.

The unity space segment objects 20E as well is the defined transformation functions TPS1, TPS2 are supplied to a distance determination unit 360 which calculates a local distance function in the unity space for each unity space segment object. The distance determination unit 360 further comprises a location determination unit 365 which, as explained above, makes available a global indicator function for interrogation points in the origin space on the basis of the local signed distance function.

All these components 350, 360, 365 of the division structure determination unit 320, even in the case of complicated free-form contours as described above, still serve to obtain at least the necessary relative location information for the different interrogation points very quickly, in order to be able to calculate the octree 100 optimally. On the basis of the octree 100 a plurality of analyses can then be undertaken and in particular a boundary surface network 1000 of the tubular object can be determined.

For this purpose the boundary surface determination system 300 comprises a network determination unit 330. The octree 100 determined with the aid of the division structure determination system 300 is made available to this network determination unit 330, which with the aid of the marching cube algorithm on the basis of the octree 100, determines the desired boundary surface network representation 1000 of the tubular object.

The boundary surface network 1000 thus determined is made available with the aid of an output interface 340 to the user of the boundary surface network determination system 300. The output interface 340 can for example involve a monitor or the like. Preferably however the boundary surface network 1000 is supplied with the aid of the output interface 340 to the memory, a network and/or a further processing device for further processing of the boundary surface network 1000.

The division structure determination system 380 and also the other described components of the boundary surface network determination system 300 can be embodied individually or in combination, preferably as software components on a computer system.

It is clear from the previous description that, with the aid of the invention, a boundary surface network with a tubular object can be determined with great speed and also with a (locally defined) high degree of accurate detail. It is pointed out here that the features of all example embodiments or developments disclosed in figures can be used in any given combination. In conclusion it is likewise pointed out that the methods and systems described in detail above merely involve example embodiments, which can be modified by the person skilled in the art in a very wide variety of ways without departing from the field of the invention. Furthermore the use of the indefinite article "a" or "an" does not preclude the features concerned also being present a number of times. Likewise the term "unit" does not preclude the components concerned consisting of a number of interoperating subunits which if necessary can also be at different locations.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining a boundary surface network of a tubular object, comprising:
providing a representation of the tubular object on the basis of image data;
providing local dimension information for points of the representation;
creating a subdivided division structure presentation of the tubular object with division cells, based on the local dimension information including a different spatial extent; and
deriving the boundary surface network on the basis of the created division structure presentation.

2. The method of claim 1, wherein one or more local segment objects is adapted to the representation.

3. The method of claim 2, wherein a topological structure of the segment objects is selected from a group of primitives.

4. The method of claim 1, wherein a spatial extent of a division cell is defined at a location so that the division cell would be able to be fitted completely into a local reference object, which is defined on the basis of the local dimension so that it would be able to be fitted into the tubular object or the local segment object at the location.

5. The method of claim 1, wherein the representation comprises a center line presentation of the tubular object including a number of center points, disposed at a distance from each other on a center line.

6. The method of claim 5, wherein local dimension information is given for center points of the center line presentation.

7. The method of claim 1, wherein the division structure comprises an octree and a division cell is formed by a cube-shaped spatial area.

8. The method of claim 1, wherein, to create the division structure presentation, starting from a start division cell, a hierarchical subdivision of division sells is undertaken, wherein a division cell is not subdivided any further at least one of
if the division cell does not have any coverage with at least one of a segment object and a bounding box which contains the segment object, and
if a local division threshold value is reached or undershot by the division cell.

9. The method of claim 8, wherein the local division threshold value is based on the local dimension information.

10. The method of claim 9, wherein the local division threshold value is defined from a number of division cells with the aid of a common scaling factor.

11. The method of claim 8, wherein the local division threshold value is defined from a number of division cells with the aid of a common scaling factor.

12. The method of claim 8, wherein a signed distance function is determined for each segment object.

13. The method of claim 12, wherein a global signed distance function is determined on the basis of a number of local signed distance functions.

14. The method of claim 13, wherein the local division threshold value is determined on the basis of at least one signed local distance function.

15. The method of claim 14, wherein the local division threshold value is determined on the basis of the global signed distance function.

16. The method of claim 14, wherein the local division threshold value is determined on the basis of the global signed distance function, and wherein, in a division cell for defining the local division threshold value, a value of at least one of the signed local distance function and the global signed distance function is defined in a division cell center.

17. The method of claim 12, wherein the local division threshold value is determined on the basis of at least one signed local distance function.

18. A non-transitory computer program product, loadable directly into one or more memories of a division structure determination system, including program code sections for performing the method of claim 1, when the program is executed in the division structure determination system.

19. The method of claim 1, wherein a signed distance function is determined for each segment object.

20. The method of claim 19, wherein a global signed distance function is determined on the basis of a number of local signed distance functions.

21. The method of claim 20, wherein the local division threshold value is determined on the basis of the global signed distance function.

22. The method of claim 20, wherein the local division threshold value is determined on the basis of the global signed distance function, and wherein, in a division cell for defining the local division threshold value, a value of at least one of the signed local distance function and the global signed distance function is defined in a division cell center.

23. A non-transitory computer readable medium including program segments for, when executed on a division structure determination system, causing the division structure determination system to implement the method of claim 1.

24. A division structure determination system for determining a division structure presentation of a tubular object, the system comprising:
an input interface, configured to provide a representation of the tubular object;

an input interface, configured to provide local dimension information for points of the representation; and a processor and a memory, the memory containing computer readable code that, when executed by the processor, configures the processor as a division structure determination unit, the division structure determination unit configured to provide a subdivided division structure presentation of the tubular object with division cells which, based on the local dimension information, include a different spatial extent.

25. A boundary surface network determination system for determining a boundary surface network of a tubular object, comprising:

the division structure determination system of claim 24; and an output interface configured to output a derived boundary surface network, wherein the processor is further configured as a network determination unit, the network determination unit configured to derive the boundary surface network on the basis of the division structure presentation.

* * * * *